Inventors
Frank A. Eich, Dec'd.
Elizabeth A. Eich, Admx.
Lloyd G. Miller
By their Attorney Inventors
Frank A. Eich, Dec'd.
Elizabeth A. Eich Admx.
Lloyd G. Miller
By their Attorney Inventors
Frank A. Eich, Dec'd.
Elizabeth A. Eich, Admx.
Lloyd G. Miller
By their Attorney

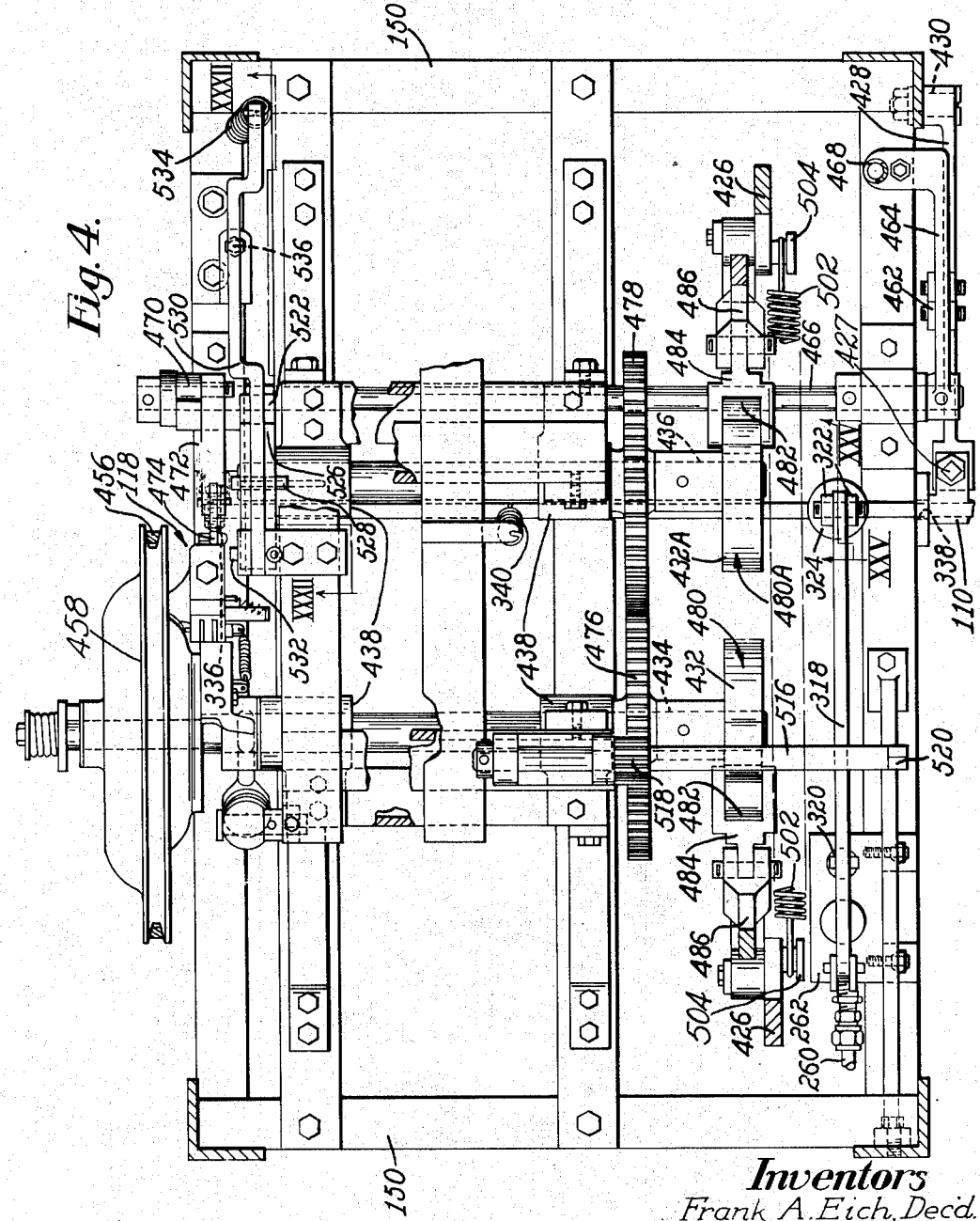

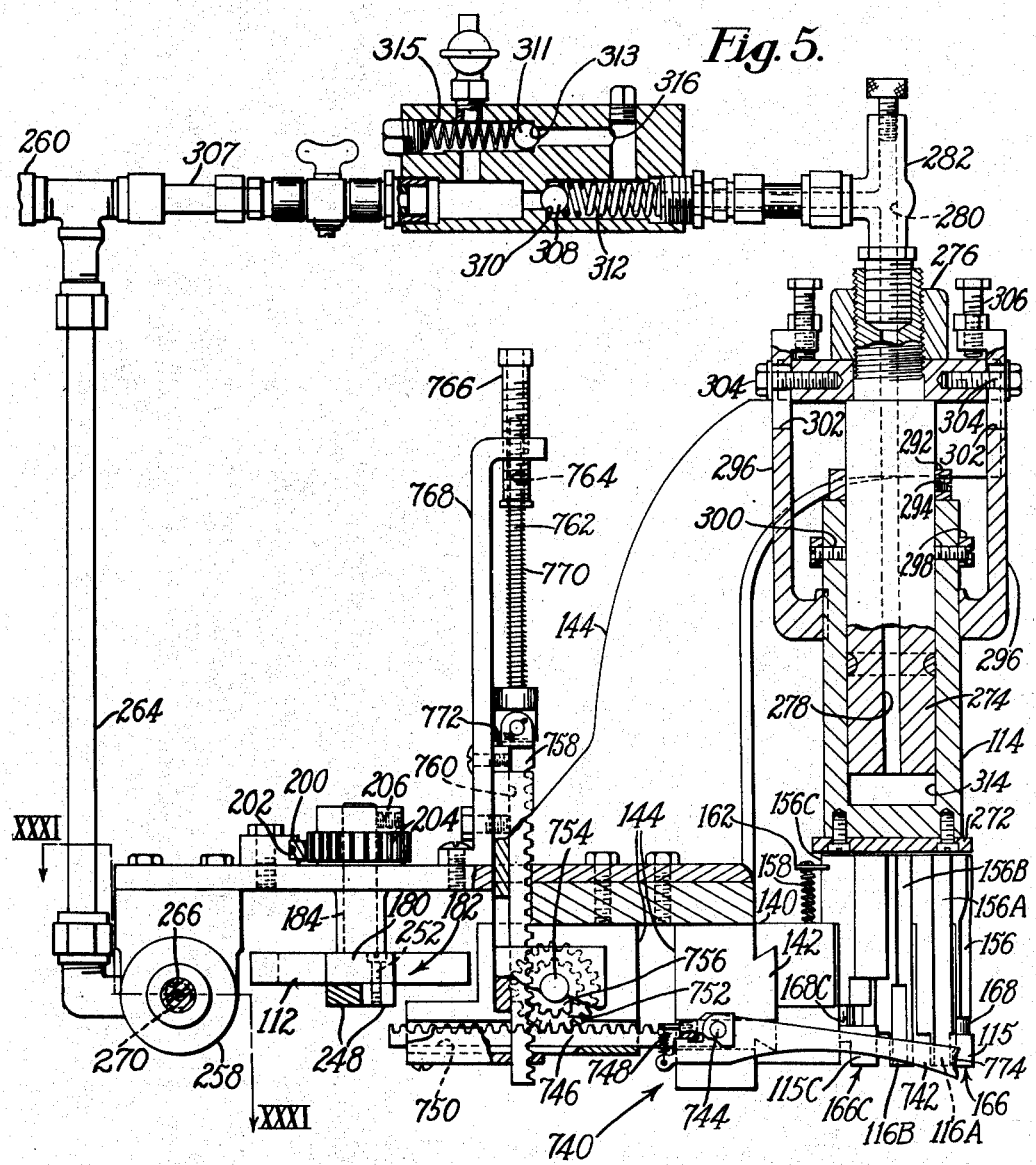

May 26, 1953
F. A. EICH ET AL
2,639,448
HEEL SEAT FITTING MACHINE
Filed March 7, 1949
17 Sheets-Sheet 6
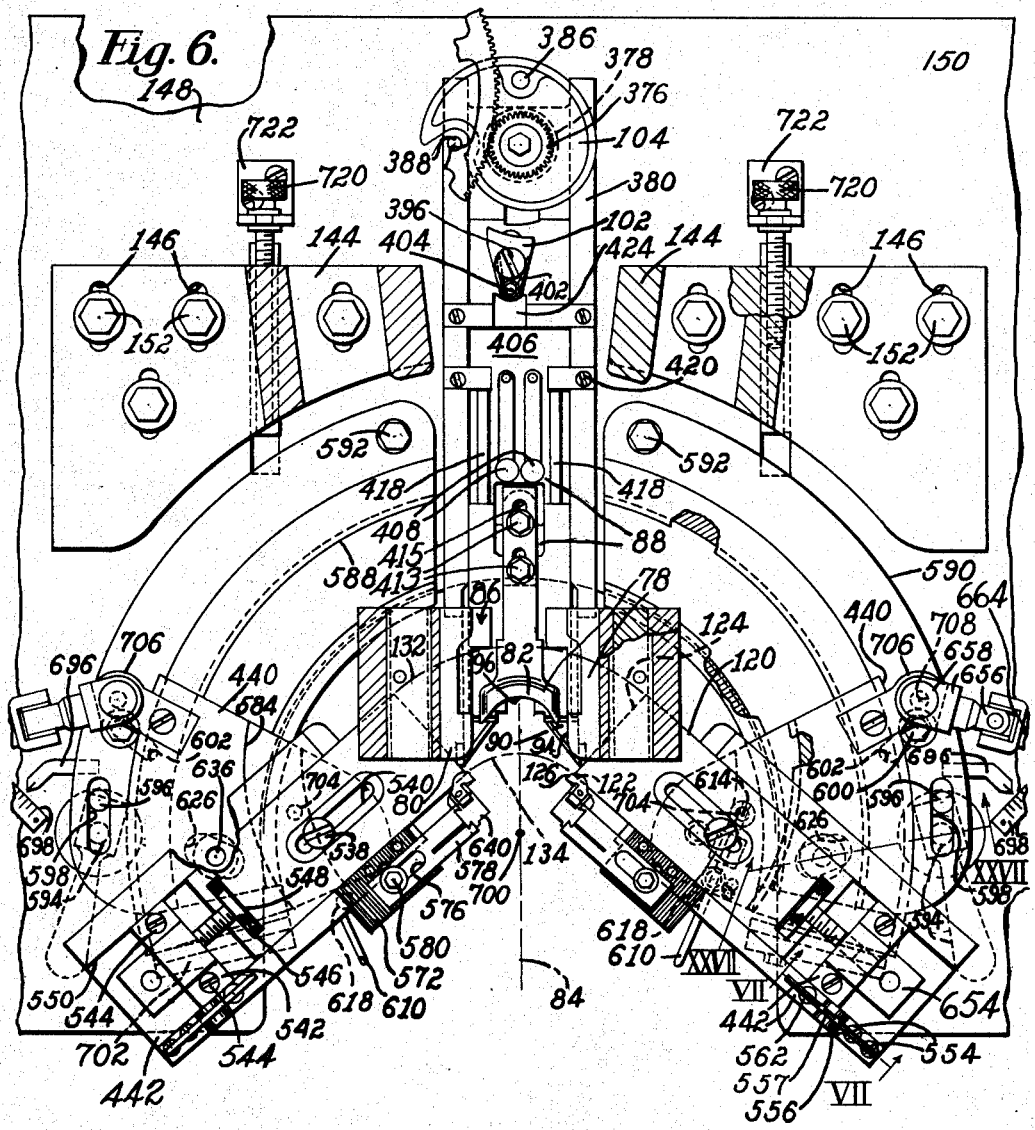
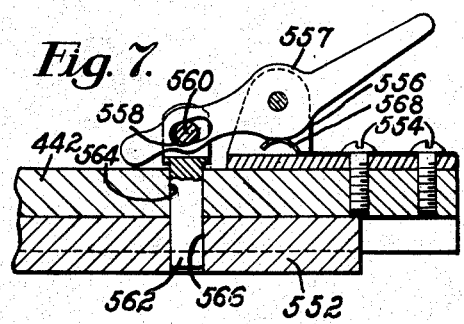
*Inventors*
Frank A. Eich, Dec'd
Elizabeth A. Eich, Admx.
Lloyd G. Miller
By their Attorney May 26, 1953  F. A. EICH ET AL  2,639,448
HEEL SEAT FITTING MACHINE
Filed March 7, 1949  17 Sheets-Sheet 7
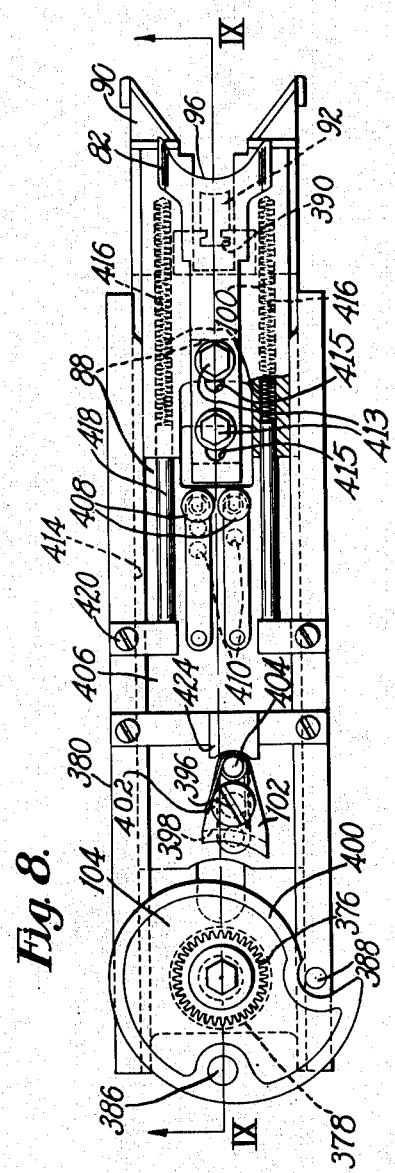
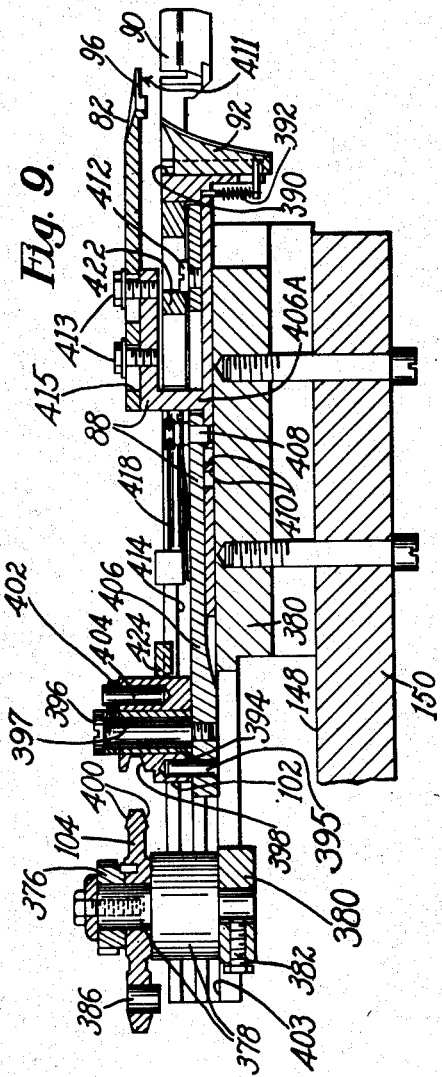
*Inventors*
Frank A Eich, Dec'd
Elizabeth A Eich, Admx.
Lloyd G Miller
By their Attorney May 26, 1953 F. A. EICH ET AL 2,639,448
HEEL SEAT FITTING MACHINE
Filed March 7, 1949 17 Sheets-Sheet 8
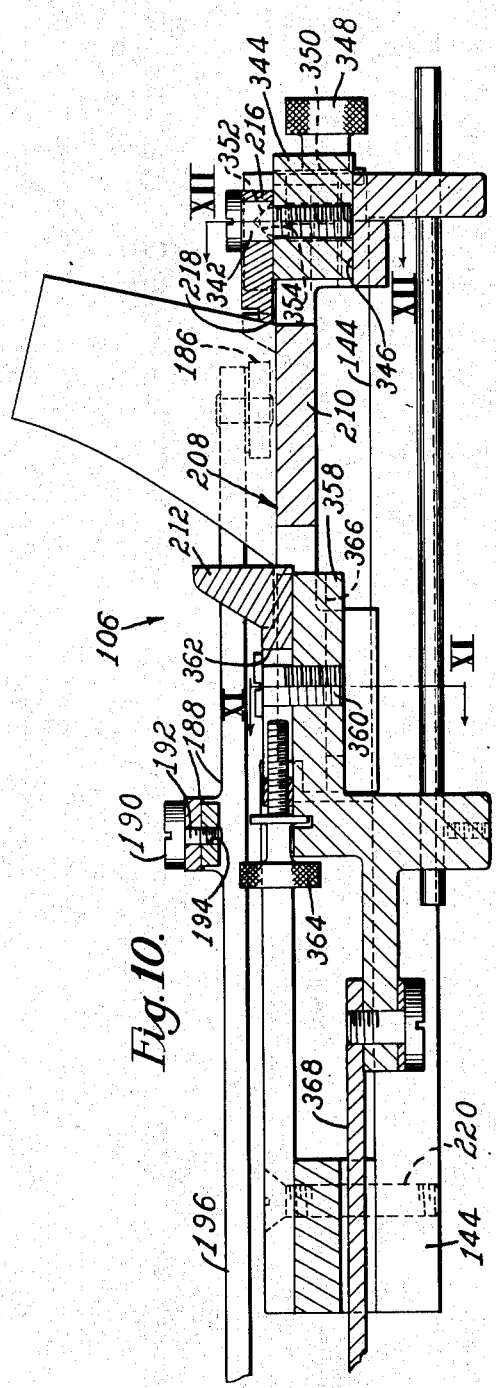
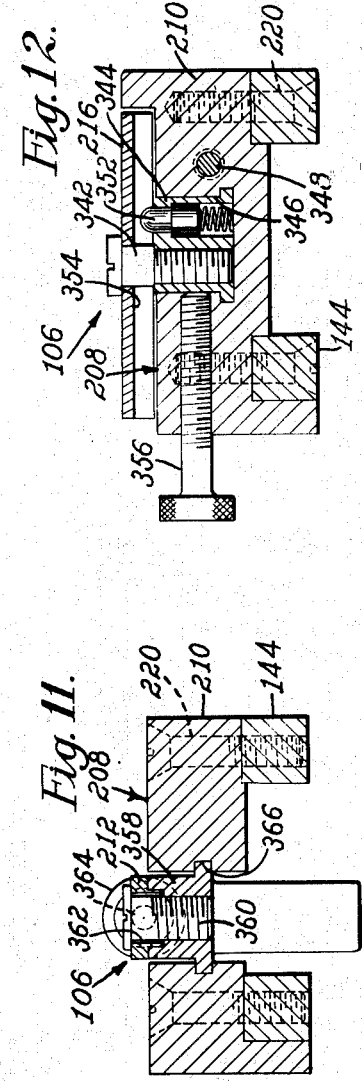
Inventors
Frank A. Eich, Dec'd.
Elizabeth A. Eich, Admx.
Lloyd G. Miller
By their Attorney

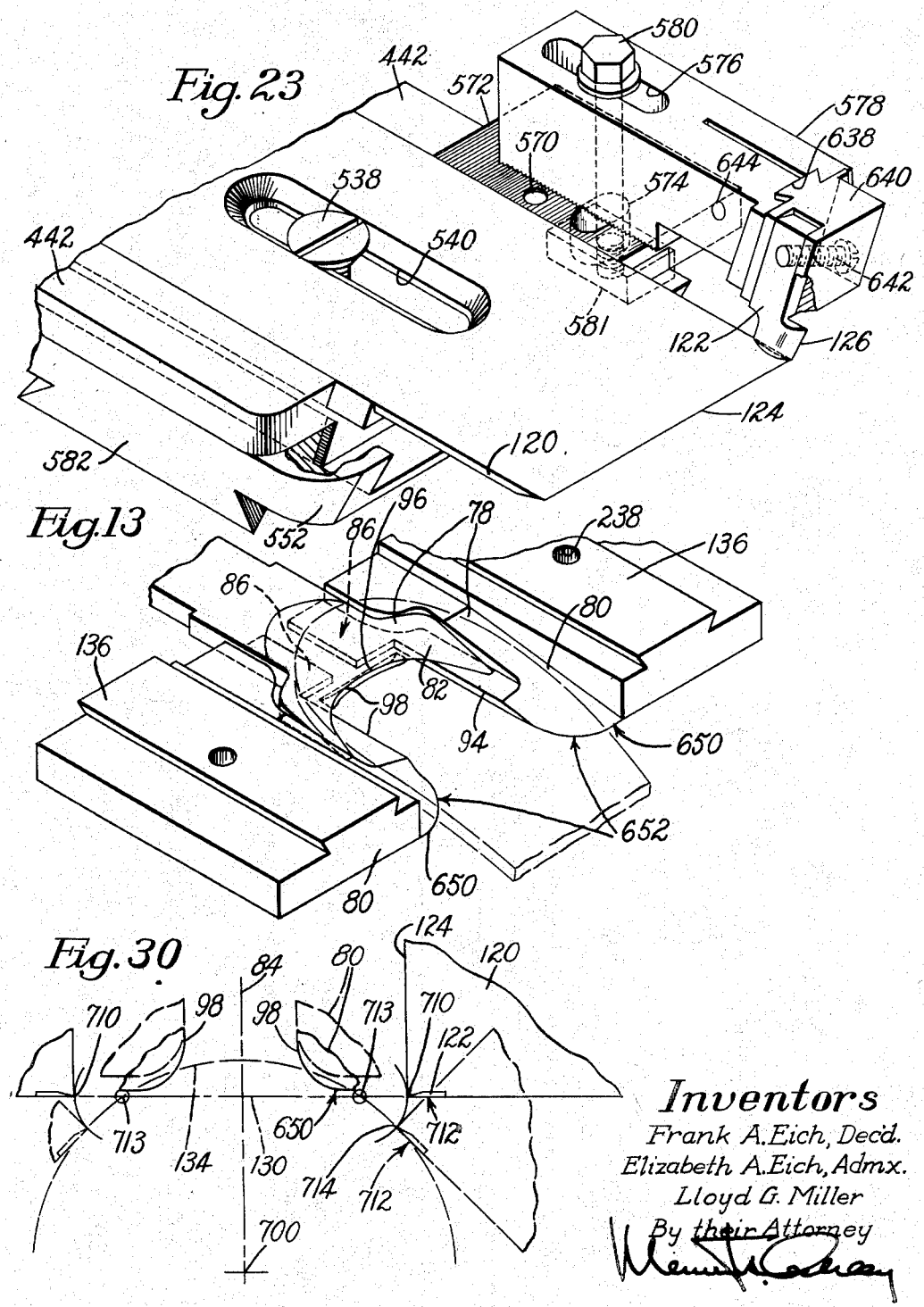

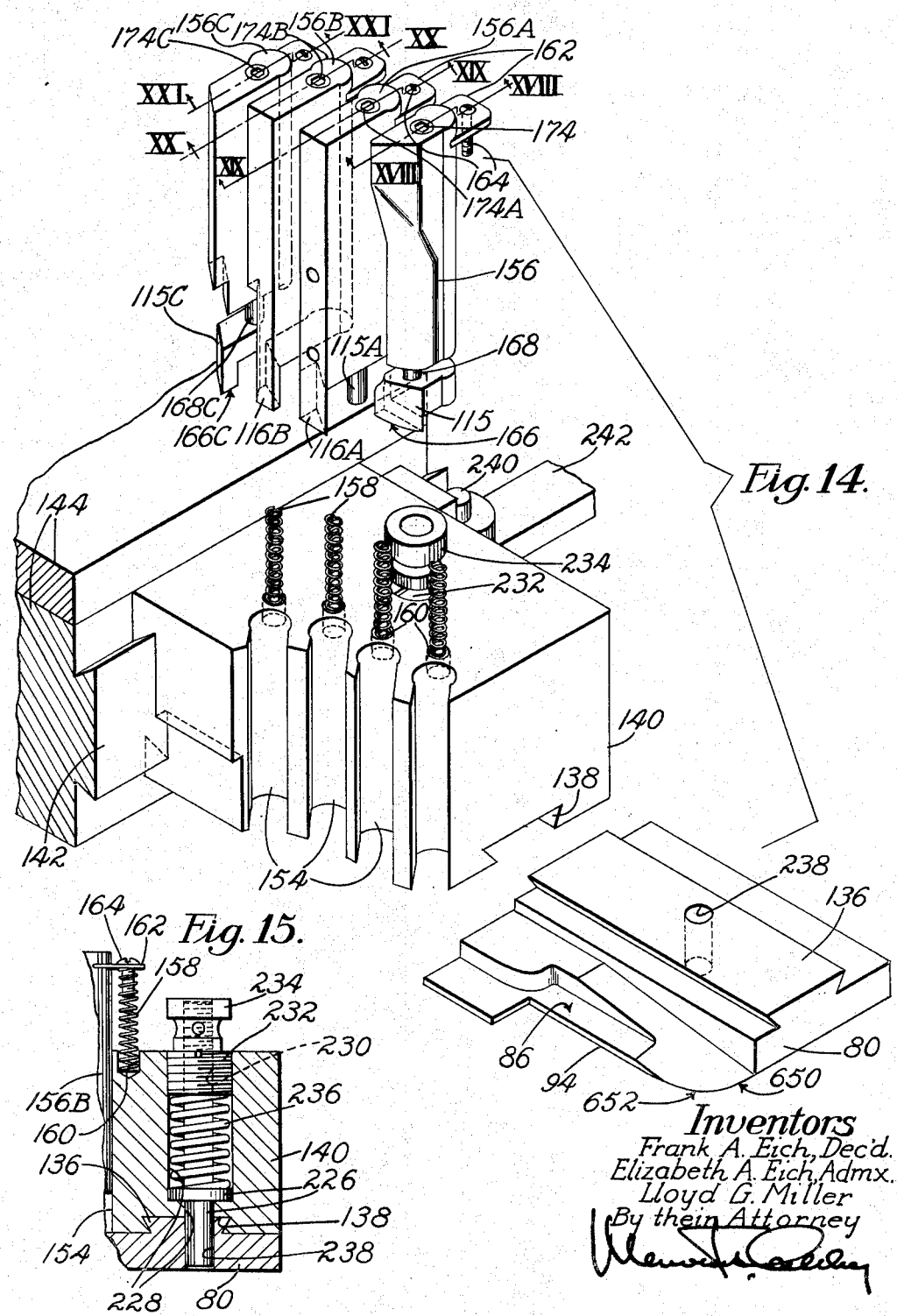

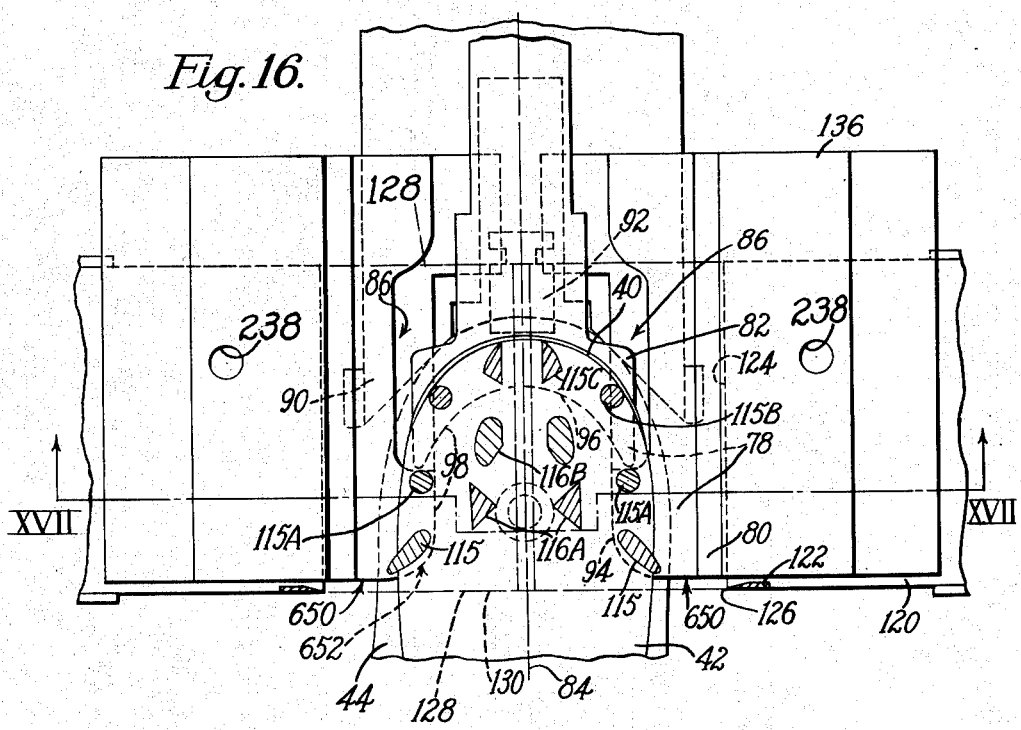
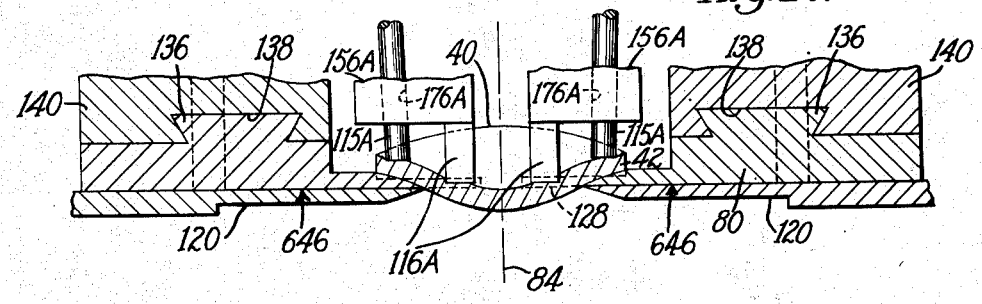
Inventors
Frank A. Eich, Dec'd
Elizabeth A. Eich, Admx.
Lloyd G. Miller
By their Attorney

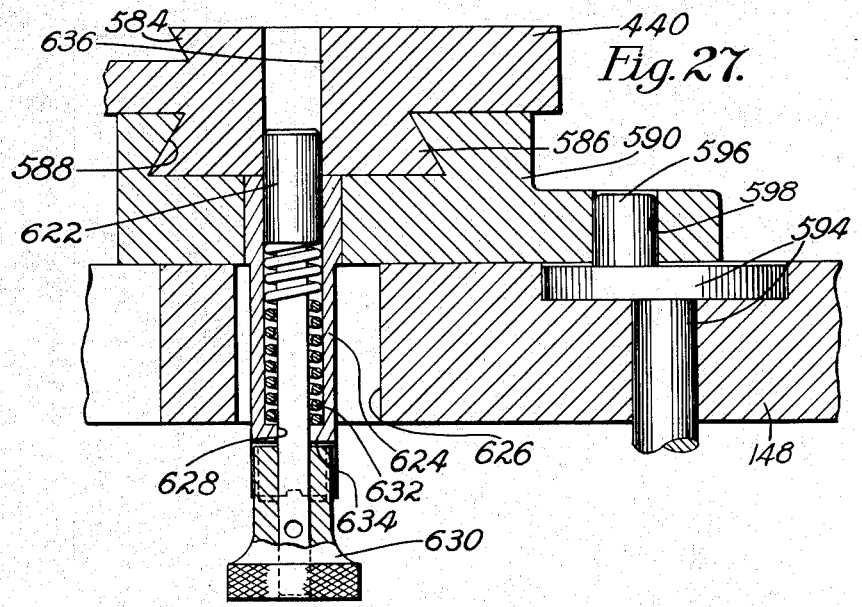
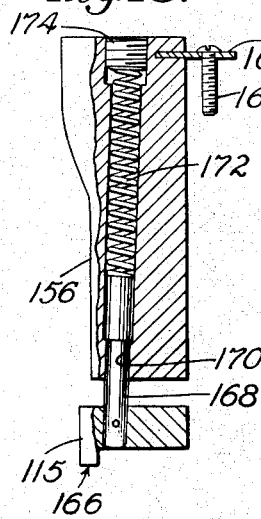
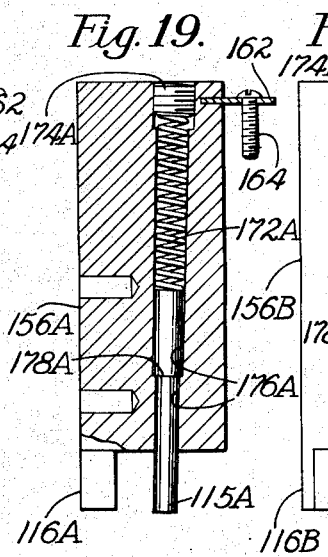
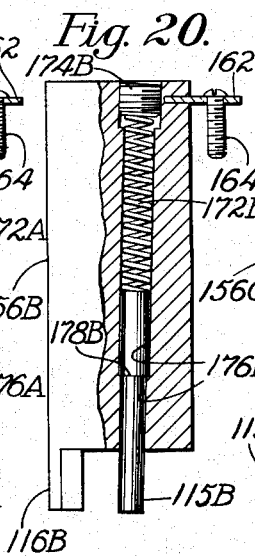
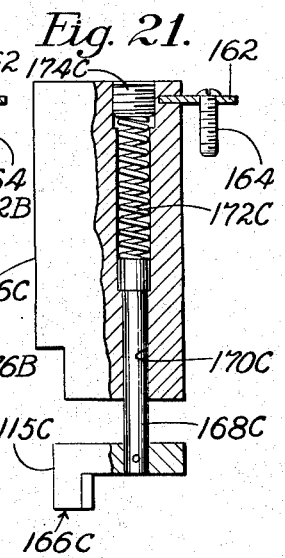

May 26, 1953
F. A. EICH ET AL
2,639,448
HEEL SEAT FITTING MACHINE
Filed March 7, 1949
17 Sheets-Sheet 13
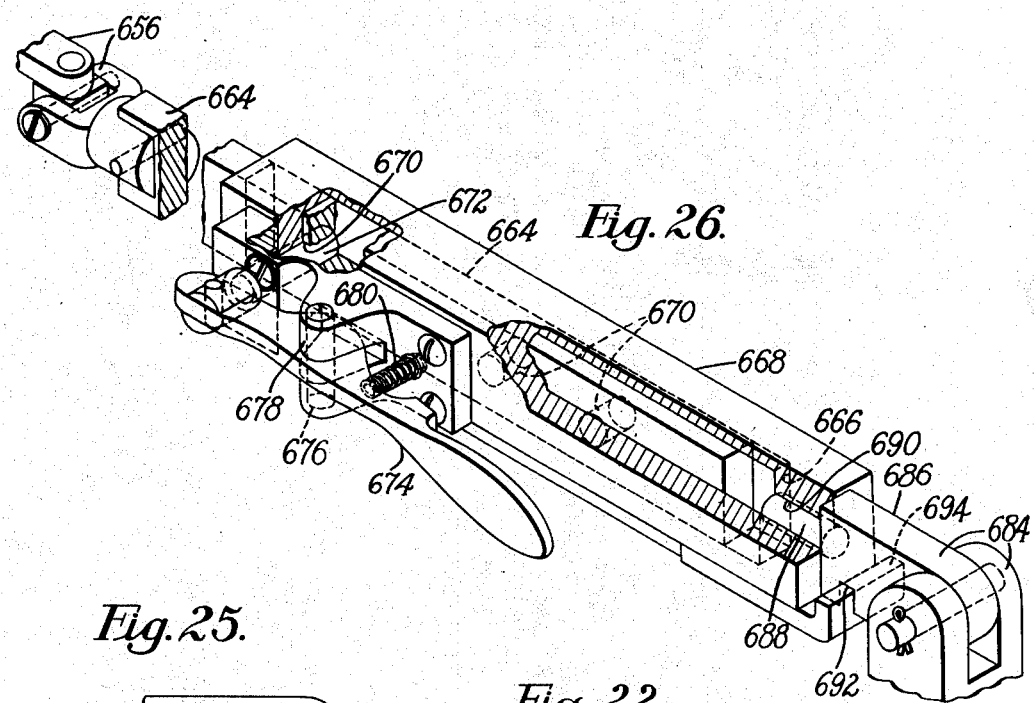
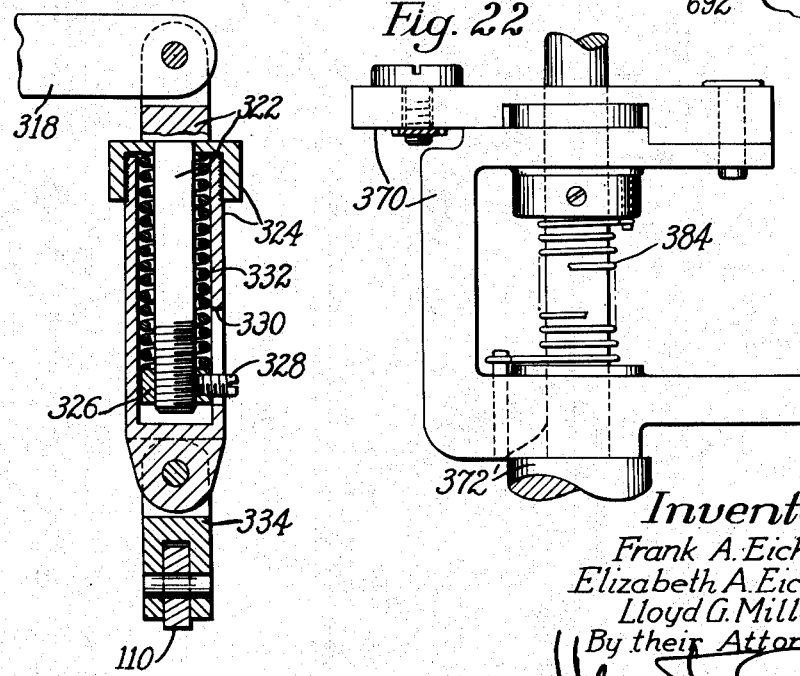
Inventors
Frank A. Eich, Dec'd.
Elizabeth A. Eich, Admx
Lloyd G. Miller
By their Attorney

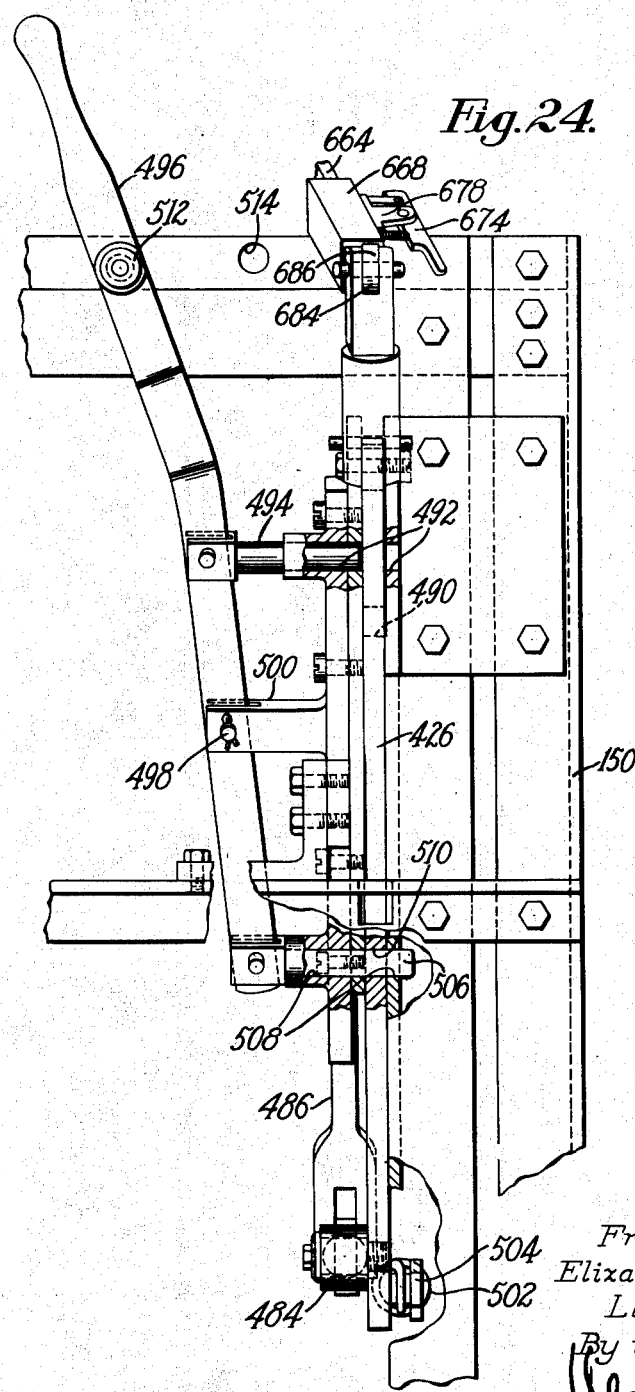

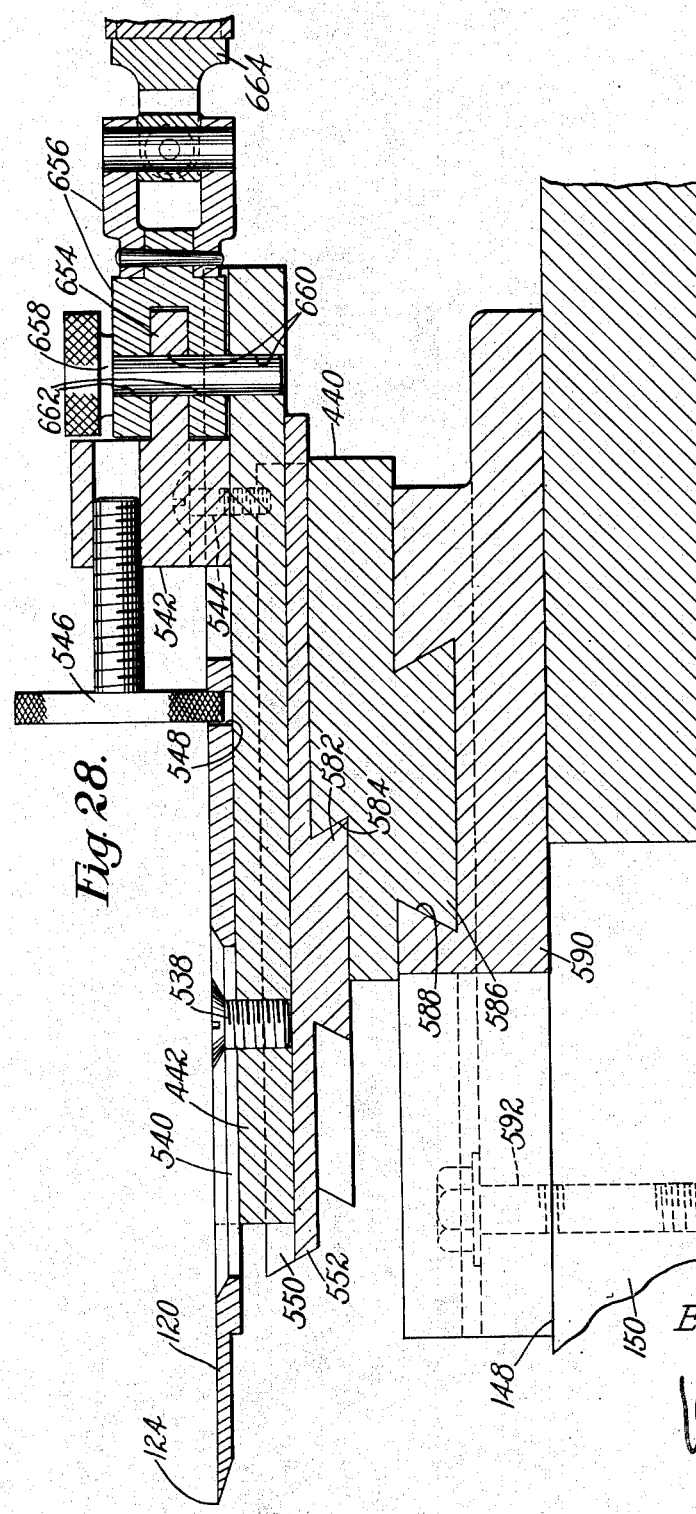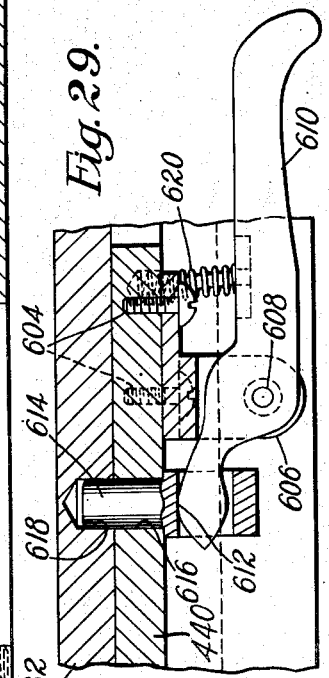

May 26, 1953  F. A. EICH ET AL  2,639,448
HEEL SEAT FITTING MACHINE
Filed March 7, 1949  17 Sheets-Sheet 16

Inventors
Frank A. Eich, Dec'd.
Elizabeth A. Eich, Admx.
Lloyd G. Miller
By their Attorney May 26, 1953   F. A. EICH ET AL   2,639,448
HEEL SEAT FITTING MACHINE
Filed March 7, 1949   17 Sheets-Sheet 17

Inventors
Frank A. Eich, Dec'd.
Elizabeth A. Eich, Admx.
Lloyd G. Miller
By their Attorney Patented May 26, 1953

2,639,448

UNITED STATES PATENT OFFICE 2,639,448

HEEL SEAT FITTING MACHINE

Frank A. Eich, deceased, late of Melrose, Mass., by Elizabeth A. Eich, administratrix, Melrose, Mass., and Lloyd G. Miller, Beverly, Mass., assignors to United Shoe Machinery Corporation, Flemington, N. J., a corporation of New Jersey Application March 7, 1949, Serial No. 80,054

27 Claims. (Cl. 12—31.5)

This invention relates to heel seat fitting machines for use in the manufacture of shoes and consists in the novel features hereinafter described, reference being had to the accompanying drawings, which illustrate one embodiment of the invention selected for purposes of illustration, said invention being fully disclosed in the following description and claims.

In the accompanying drawings,

Fig. 4 is a plan view on line IV—IV of Fig. 1;

Fig. 5 is a vertical section on line V—V of Fig. 2;

Fig. 6 is a plan view on line VI—VI of Fig. 3 showing tab and shoulder forming knives adjusted for operation upon Cuban work;

Fig. 7 is a section on line VII—VII of Fig. 6;

Fig. 8 shows in plan mechanism for positioning shoes in the illustrative machine;

Fig. 9 is a section on line IX—IX of Fig. 8;

Fig. 10 is a section on line X—X of Fig. 2 showing portions of a heel measuring gage set for Cuban work;

Figs. 11 and 12 are sections on lines XI—XI and XII—XII of Fig. 10;

Fig. 13 is an angular view showing in detail a platen of the machine;

Fig. 14 is an exploded view showing in perspective mechanism for deforming a heel seat portion of an attached outsole of a shoe;

Fig. 15 is a sectional view showing in detail mechanism for securing side crease plates of the platen to blocks which carry said plates;

Fig. 16 is a view illustrating in plan the positions of the platen as well as presser members and bulgers of the machine with relation to the heel seat portion of the attached outsole of the shoe, preparatory to trimming said outsole for the reception of a Louis heel;

Fig. 17 is a section on line XVII—XVII of Fig. 16 as tab forming knives are about to operate upon a distorted heel seat portion of the outsole of the shoe;

Figs. 18, 19, 20 and 21 are vertical sections on lines XVIII—XVIII, XIX—XIX, XX—XX, XXI—XXI respectively of Fig. 14 showing details of construction of the presser members and the bulgers;

Fig. 22 is a view on line XXII—XXII of Fig. 2;

Fig. 23 is an angular view showing on an enlarged scale cutting portions of tab and shoulder forming knives of the machine;

Fig. 24 is a view on line XXIV—XXIV of Fig. 1 showing on an enlarged scale mechanism for varying throws of knife actuating means to adapt the machine for operation upon Louis or Cuban work;

Fig. 25 is a section on line XXV—XXV of Fig. 4;

Fig. 26 shows in perspective, partly broken away, portions of mechanism for operating the tab and shoulder forming knives;

Fig. 27 is a section on line XXVII—XXVII of Fig. 6;

Fig. 28 is a section on line XXVIII—XXVIII of Fig. 2;

Fig. 29 is a section on line XXIX—XXIX of Fig. 2 showing a lock for securing in two different angularly adjusted positions upon a carrier block, a platform upon which a carrier for one of the shoulder forming knives is mounted;

Fig. 30 is a diagrammatic view for use in describing the operation of mechanism for initially adjusting the machine for Louis or Cuban work;

Figure 1:
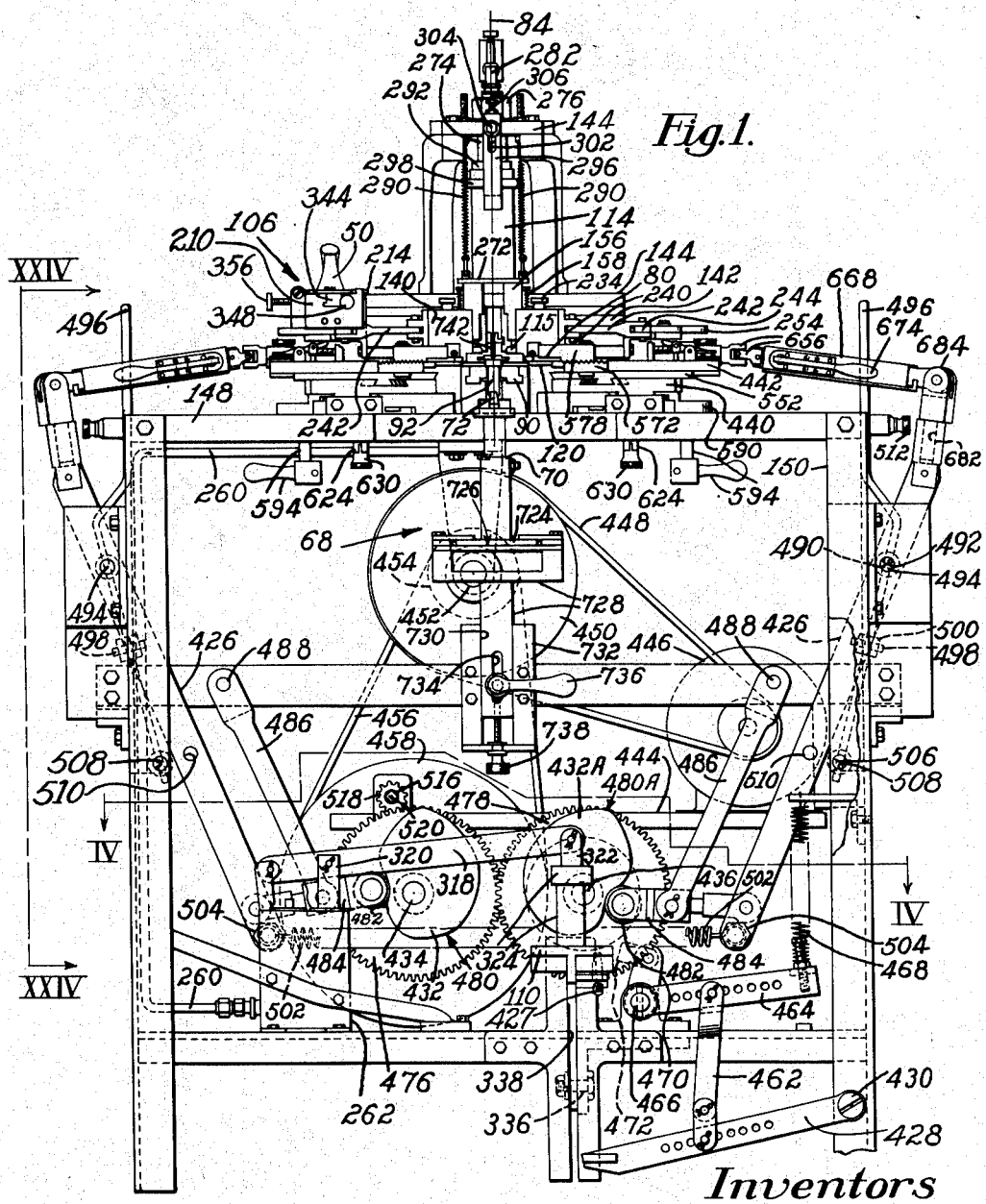
Fig. 1 is a front view of the illustrative heel seat fitting machine.

The illustrative machine is adapted to reduce the heel seat portions 40 of attached outsoles 42 of shoes 44 to form heel seat tabs 46, 46A and simultaneously therewith to form heel breast receiving shoulders 48, 48A, thereby fitting the shoes for the reception of Louis and Cuban wood heels 50, 50A. In order effectively to trim the outsoles 42 for the reception of the heels 50, 50A it is desirable that the tabs 46, 46A shall be approximately complemental to the attaching faces of the heels 50, 50A and that when such heels are positioned upon the shoes 44 with the rims of their attaching faces in substantial engagement with the overlasted margins of the counter portions of the shoes adjacent to break lines 52 of said overlasted counter portions, the breasts of the heels shall be in engagement with the heel breast receiving shoulders 48, 48A. In order to insure that the rear lateral portions 62 of the shank of the outsole 42 of the shoe 44 shall be held in engagement with the shoe upper against the common tendency to sag away from said upper, it is desirable to form at the forward lateral portions of the tabs 46, 46A fillets 64, 64A upon which the forward lateral corners of the attaching face of the heel rest. The fillets 64, 64A are continuous with the bevel faces 66, 66A of the tabs 46, 46A and decrease in thickness as they extend toward the edges of the outsoles and away from the heel breast receiving shoulders 48, 48A, the construction and arrangement of the fillets being such that in the finished shoes 44 they are not visible and hold the rear lateral portion 62, 62A of the shanks of the outsoles 42 against sagging.

The machine in some respects, for example, with reference to an outsole supporting platen and outsole clamping and bulging mechanism hereinafter described, is similar to corresponding parts and mechanism disclosed in United States Letters Patent No. 2,215,524, granted September 24, 1940, on an application filed in the name of George Hazelton, and in other respects, mainly heel gaging and shoe positioning means, the machine is similar to corresponding means disclosed in United States Letters Patent No. 1,190,371, granted November 13, 1934, on an application filed in the name of Earl A. Bessom.

The illustrative machine is provided with a work support 68 (Figs. 1 and 2) which will be hereinafter described and comprises a slidable pedestal 70 having a pin 72 constructed and arranged for reception in a thimble hole 74 of a last 76 upon which the shoe 44 is mounted. The work support is used by some operators. However, as in various prior heel seat fitting machines in which work supports are optional, the operators usually prefer to use the machines without the work supports, the work being presented by hand to the machines.

The machine comprises a platen 78 (Figs. 6, 13 and 16) consisting of a pair of side crease or matrix plates 80 and a back or rear crease or matrix plate 82, the side crease plates being slidable transversely of the machine into different operative positions toward and away from one another and toward and away from a central heightwise plane 84 of the machine and the platen. The rear crease plate 82 is mounted for movement forward and rearward of the machine into different adjusted positions upon surfaces 86 (Fig. 13) of the side crease plates 80 and is adjustably secured to a carrier 88 upon which is mounted a centralizing fork 90 and a back gage 92 (Fig. 9) of the machine. The heel seat portion 40 of the attached outsole 42 of the shoe 44 positioned in the machine overlies the platen 78, edges 94, 96 of the side and rear crease plates 80, 82 respectively forming an opening 98 which will be described as U-shaped and has laterally flaring forward ends. The heel seat portion 40 of the attached outsole 42 of the shoe 44 is positioned over the platen 78 as the shoe is presented bottom up and heel end away from the operator with the rear counter portion of the shoe in engagement with the centralizing fork 90. Rearward pressure applied to the shoe thus positioned first causes the centralizing fork 90 to yield against the action of springs 100 and the rear end of the counter portion of the shoe to engage the back gage 92 which is thereafter moved rearward together with the centralizing fork against the action of said springs 100 until an arrester 102 hereinafter described in detail and mounted upon the carrier 88 has its movement limited by a spiral abutment or stop 104 (Fig. 8) initially set in accordance with the length of the measured heel 50 or 50A in a heel measuring gage 106 (Figs. 1 and 10).

The side crease plates 80 are initially so adjusted by mechanism hereinafter described that as the shoe 44 is moved rearward against the centralizing fork 90 and the back gage 92 the edges 94 of the side crease plates enter the rand crease of the shoe and if necessary break any cement bond between the lateral margins of heel seat portion 40 of the outsole 42 and the overlasted counter portion of the shoe. Shoes operated upon by the illustrative machine commonly have their outsoles 42 unattached from the shoe uppers rearward of heel breast lines 108, 108A of the outsoles but in some shoes the heel seat portions 40 of the outsoles 42 are attached at their central parts to the shoe uppers by staples (not shown) and in cement work the heel seat portions of outsoles of shoes are often partially attached to the overlasted counter portions of the shoes by cement.

In the use of the present machine as in the machines disclosed in said Letters Patent Nos. 1,980,371 and 2,215,524, the heel seat portion 40 out the outsole 42 of the shoe 44 is deformed preparatory to trimming said heel seat portion and accordingly it is desirable that the heel seat portion of the outsole except at its central part shall be unattached from the shoe upper. When the heel seat portions 40 of outsoles 42 of the shoes 44 are extremely thick it is desirable that the beveled faces 66, 66A at opposite sides of the tabs 46, 46A shall practically meet each other at the median portion of the tab and with such a construction it is not practicable in the present machine to operate upon shoes the central parts of the heel seat portion of the outsoles of which have been stapled to the shoe uppers.

After the shoe 44 has been positioned in the machine as above described the side crease plates 80 are moved inward toward one another upon depression of a treadle 110, to positions determined by mechanism including a stop or stop cam 112 (Fig. 2) which is set in accordance with the width of the heel 50 or 50A in the heel measuring gage 106. When the inward limits of movement of the side crease plates 80 have been reached continued depression of the treadle 110 (Fig. 1) through mechanism hereinafter described causes downward movement of a hollow plunger 114 (Fig. 5) to force presser members 115, 115A, 115B and 115C against the margin of the heel seat portion 40 of the outsole 42 to clamp said margin against portions of the platen 78 bordering the U-shaped opening 98 and thereafter to cause bulgers 116A, 116B to force the central part of said heel seat portion through the U-shaped opening to the position illustrated in Fig. 17.

Figure 3:
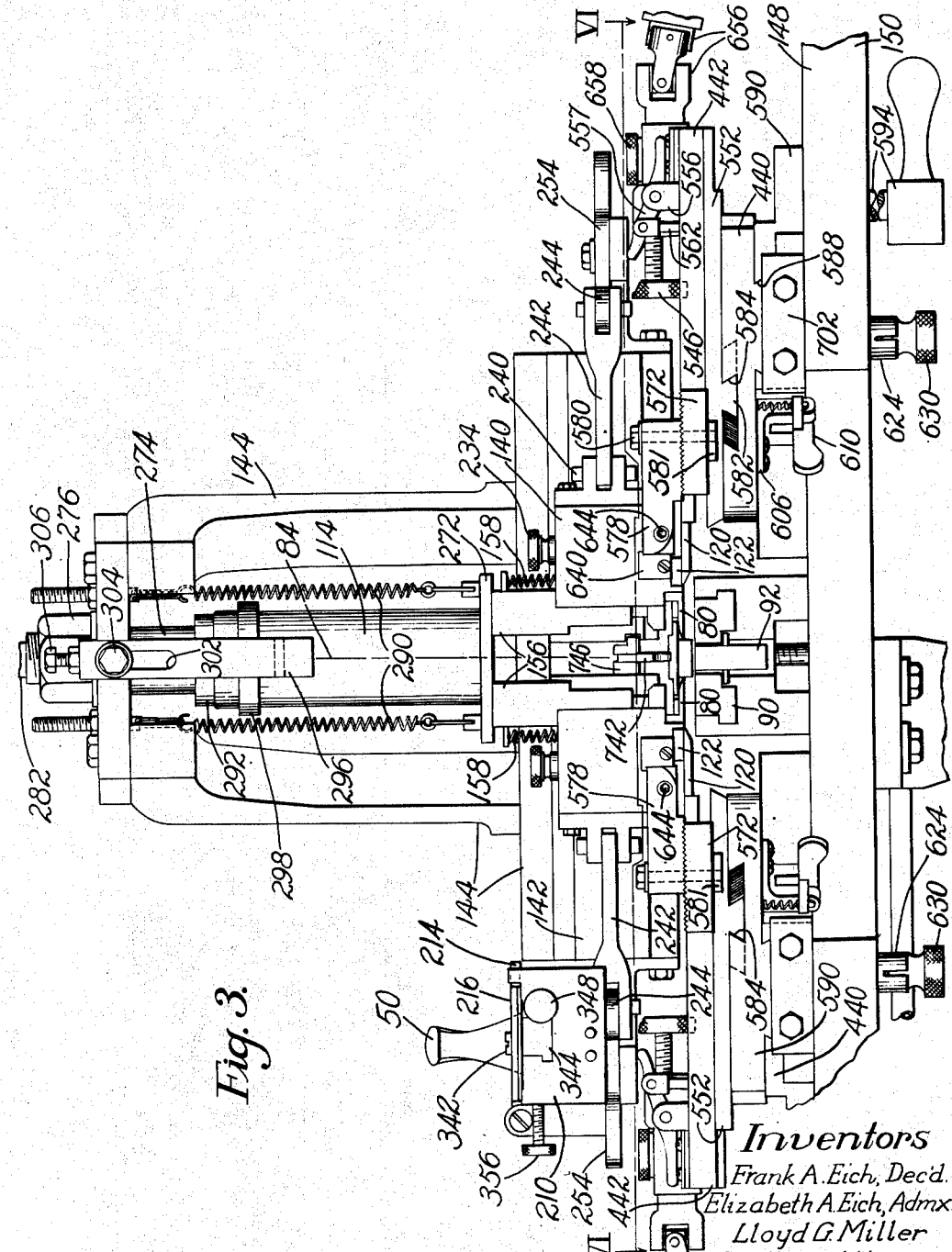
Fig. 3 is a front view of the upper portion of the machine on an enlarged scale.

When the heel seat portion 40 of the outsole 42 of the shoe 44 has been clamped and deformed as above described the treadle 110 is further depressed to trip a one-revolution clutch 118 (Fig. 4) thereby moving, through mechanism hereinafter described, associated pairs of tab and shoulder forming knives 120 and 122, respectively (Fig. 3), toward each other to trim a horseshoe shaped chip from the outsole and to form the heel seat tab 46 or 46A and the heel breast receiving shoulders 48 or 48A. It will be noted that in fitting the shoe 44 for the reception of the Louis heel 50 cutting edges 124 of the tab forming knives 120 and the lower ends of cutting edges 126 of the shoulder forming knives 122 move in rectilinear paths 128 (Figs. 16 and 17), 130 toward and away from each other and that when the shoe is being fitted for the reception of the Cuban heel 50A the cutting edges 124 of the tab forming knives 120 and the lower ends of the cutting edges 126 of the shoulder forming knives 122 move in circular paths 132, 134 (Fig. 6) which may be varied slightly as will hereinafter be explained. As the tab and shoulder forming knives 120, 122 move to their retracted rest positions away from one another the operator removes his foot from the treadle 110 to enable the bulgers 116A, 116B and the presser members 115, 115A, 115B and 115C to be raised by spring action and thereafter the side crease plates 80 to move away from each other to their laterally retracted positions, the shoe at such time being removed from the machine.

The side crease plates 80 (Figs. 13 and 17) are provided with upstanding dovetail portions 136 fitting in dovetail recesses 138 of blocks 140 (Figs. 3 and 14) movable laterally toward and away from each other on a dovetail guide portion 142 (Figs. 3 and 5) of an adjustable multipart head 144 a foot portion of which is provided with slots 146 (Figs. 2 and 6) and which, except while making certain adjustments hereinafter described, is secured to a table top 148 of a main frame 150 of the machine by screws 152 which pass through said slots and are threaded into the table top. As will be explained later, in changing over from Louis to Cuban work or vice versa or in operating upon Cuban work of a wide run of sizes it is desirable to shift the head 144 slightly forward or rearward in order to adjust the platen 78 with relation to the paths of movement 130 (Fig. 16), 134 (Fig. 6) of the lower ends of the cutting edges 126 of the shoulder forming knives 122 and for this reason the head is adjusted upon the table top 148 as above explained.

Each of the blocks 140 is provided with four grooves 154 (Figs. 14 and 15) for receiving carrier slides 156, 156A, 156B and 156C which are constantly urged to their raised positions in the grooves by springs 158. The springs 158 have their lower ends housed in recesses 160 of the associated blocks and their upper ends in engagement with lugs 162 secured to the associated carrier slides, screws 164 threaded into the lugs serving to retain the springs in their operating positions.

The lower ends of the front and rear presser members 115, 115C have outsole engaging faces 166, 166C. They also have shanks 168, 168C (Figs. 18 and 21) slidingly fitting in bores 170, 170C of the respective carrier slides 156, 156C, the enlarged heads of the shanks normally being forced against the lower ends of enlarged portions of said bores by springs 172, 172C held in said bores by nuts 174, 174C threaded into the carrier slides. The bulgers 116A, 116B are formed integral with the carrier slides 156A, 156B which have formed in them bores 176A, 176B for slidingly receiving the presser members 115A, 115B. The presser members 115A, 115B are constantly urged downward by springs 172A, 172B which are housed in enlarged portions of said bores and have their upper and lower ends in engagement with the presser members and with nuts 174A, 174B threaded into the carrier slides. Downward movement of the presser members 115A, 115B is limited by the engagement of heads of the presser members with shoulders 178A (Fig. 19), 178B of the carrier slides 156A, 156B. The presser members 115, 115A, 115B and 115C may collectively be referred to as a clamp or as clamping units and the bulgers 116A, 116B may be collectively referred to as a bulger.

Movement of the blocks 140 and accordingly the side crease plates 80 toward each other is limited by the engagement of abutments 180 (Figs. 2 and 5), which are operatively connected to the blocks, with spiral faces 182 of the cam 112 which is secured to a shaft 184 rotatable in a boss of the head 144. The cam 112 is set by mechanism hereinafter described in different angularly adjusted positions in accordance with the positions of rolls or abutments 186 (Figs. 2 and 10) which are associated with the heel measuring gage 106 and are mounted on bell crank levers 188 pivoted upon fulcrum studs 190 secured to the head 144. In order to constrain the bell crank levers 188 for equal angular movement in opposite directions, one of the bell crank levers has secured to it a depending pin 192 which fits in an elongated slot 194 formed in the other bell crank lever. One of the bell crank levers 188 has formed integral with it an adjustable rearwardly extending arm 196 operatively connected by an adjustable link 198 (Fig. 2) to a rack 200 (Figs. 2 and 5) slidable in a guideway 202 of the head 144. The rack 200 meshes with a gear 204 which is secured by a screw 206 (Fig. 5) to the shaft 184 and through which the stop cam 112 is supported for rotation in the head 144.

The heel to be attached to the shoe which is to have its heel seat fitted is inserted attaching face down upon a flat upper surface 208 (Fig. 10) of a support 210 of the heel measuring gage 106 by forcing the rear end of the rim of the attaching face of the heel against a spring actuated slidable abutment 212 and simultaneously therewith pushing the rollers 186 apart. When there is sufficient space to set the heel, attaching face down, upon the surface 208 of the support 210, the heel is released and the spring actuated abutment 212 forces (in operating upon Louis work) the breast of the heel against a bar 214 (Fig. 2) or (in operating upon Cuban work) forces the breast of the heel against a plate 216 which, after the bar has been swung away from the plate, is turned 180° from its position shown in Fig. 2 to an operative position (Fig. 10) in which a convex surface 218 thereof is engaged by the breast of the heel. The support 210 is secured to the head 144 by screws 220 (Fig. 12). The heel measuring gage 106 with the exception of mechanism for measuring the attaching face of the heel widthwise is substantially identical with the gage disclosed in United States Letters Patent No. 2,277,076, granted March 24, 1942, on an application filed in the name of William S. Dallas. The rolls 186 are constantly urged toward each other by a spring 222 (Fig. 2) one end of which is attached to the rearwardly extending arm 196 and the other end of which is secured to the head 144. Inward movement of the rolls when there is no heel in the gage is limited by the engagement of one of two shoulders 224 of the stop cam 112 with an associated abutment 180.

As above explained, the side crease plates 80 have the dovetail projections 136 which fit in the grooves 138 formed in the lower faces of the blocks 140, said crease plates being held in the grooves by pins 226 (Fig. 15) which are slidable in two diameter bores 228 in the blocks. Each of the pins 226 passes through a bore 230 in a nut 232 threaded into an associated block 140 and has threaded onto it a nut 234, a spring 236 being interposed between a flange portion of the pin and the nut 232 to urge the pin constantly downward into a bore 238 of the associated crease plate 80. Preparatory to withdrawing the side crease plates 80 from the blocks 140 the nuts 234 are lifted to withdraw the pins 226 from the recesses 238. Each of the blocks 140 moves slidingly along the dovetail guide portion 142 of the head 144, said guide portion extending transversely of the machine at right angles to the central heightwise plane 84. Pivoted upon pins 240 (Figs. 2 and 3) carried by the blocks 140 are links 242 pivotally connected to the forward ends of levers 244 mounted upon studs 246 (Fig. 2) threaded into the head 144.

Pivotally mounted upon the levers 244 are bars 248 (Figs. 2 and 5) which are guided and supported in slots 250 of the head 144, pass beneath the stop cam 112 and to the inner ends of which are secured by screws 252 the abutments 180. Mounted for movement into different angularly adjusted positions upon the head 144 are eccentric stops 254 which are initially set to limit outward movement of the blocks 140 and accordingly the side crease plates 80, the levers 244 when the machine is at rest being forced against the stops by springs 256 (Figs. 2 and 31), outer and inner ends of which are attached to the rear end portions of the levers and to a housing 258 hereinafter described secured to the head. As above explained, when the machine is idle the side crease plates 80 are so positioned that their inner edges 94 enter the rand crease of the shoe as the shoe is positioned in the machine, the rest positions of the plates being varied by adjusting the stops 254.

Figure 31:
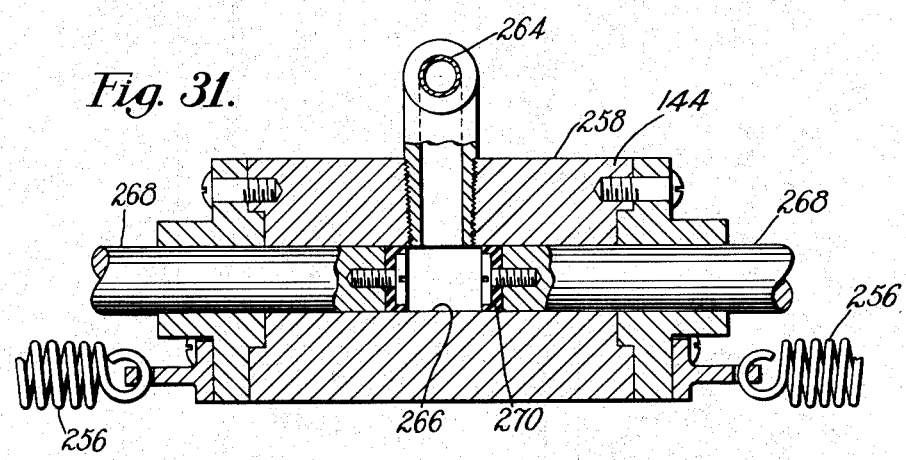
Fig. 31 is a section on line XXXI—XXXI of Fig. 5 showing portions of mechanism for operating the side crease plates of the machine.

The mechanism for moving the side crease plates 80 inward to their operative positions determined by the position of the heel gauge controlled stop cam 112, and for moving the hollow plunger 114 to actuate the presser members 115, 115A, 115B and 115C and the buglers 116A and 116B is operated by hydraulic power transmitting means best shown in Figs. 1 and 5 in response to depression of the treadle 110. When the treadle 110 is first depressed oil in a pipe 260 (Figs. 1, 4 and 5) leading from an accumulator 262 at the bottom of the machine to the rear upper portion of the machine travels downward through a pipe 264, threaded in the housing 258 which is secured to the head 144, and into a cylindrical chamber 266 (Fig. 31).

Pivoted to the rear ends of the levers 244 are rods 268 which have secured to their inner ends washers 270 and are slidable toward and away from each other in the cylindrical chamber 266. It will be apparent from the foregoing that when pressure is exerted upon the oil in the cylindrical chamber 266 the rods 268 are moved outward against the action of the springs 256 causing the blocks 140 and accordingly the side crease plates 80 to move inward, that is toward the central heightwise plane 84 of the machine, until the abutments 180 on the bars 248 engage the associated spiral faces 182 of the cam 112.

As above stated, the carrier slides 156, 156A, 156B and 156C are operated by the hollow plunger 114 which comprises a plate 272 constructed and arranged upon downward movement of the plunger to cause the presser members 115, 115A, 115B and 115C to force the margin of the heel seat portion 40 of the outsole 42 of the shoe against portions of the platen 78 bordering the U-shaped opening 98 and thereafter to cause the bulgers 116, 116A to force the central part of said heel seat portion through the U-shaped opening preparatory to trimming the outsole.

The hollow plunger 114 is slidingly mounted upon a vertically disposed cylindrical guide 274 (Figs. 1, 3 and 5) which is secured to the head 144 by a nut 276 and has an oil receiving bore 278 in register with a passage 280 in a T-shaped connection 282 threaded into the guide. The hollow plunger 114 is constantly urged upward by a pair of strong springs 290 the lower ends of which are attached to the plate 272 of the plunger and the upper ends of which are attached to the head 144. Upward movement of the hollow plunger 114 is limited by a collar 292 secured by one or more screws 294 (Fig. 5) to the guide 274. Mounted upon the head 144 and having their lower ends in sliding engagement with the hollow plunger 114 are stops 296 which are engaged by a collar 298, secured by screws 300 to the plunger, upon downward movement of the plunger said stops limiting downward movement of the plunger. The stops 296 are provided with elongated slots 302 and passing through said lots and threaded into the head 144 are screws 304. Threaded through flange portions of the stops 296 are set screws 306 lower ends of which engage the head 144. The limit of downward movement of the bulgers 116A, 116B may be varied by setting the stops 296 in different heightwise positions upon the head 144.

When during depression of the treadle 110 inward movement of the side crease plates 80 has been limited by the engagement of the abutments 180 with the spiral faces 182 of the stop cam 112, pressure of oil in a pipe 307 (Fig. 5) will rise to an extent sufficient to move a ball 308 normally forced against a seat 310 by a strong spring 312 against the action of said spring. Oil flowing past the ball 308 and through the passage 280 in the T-shaped connection 282 and the passage 278 of the guide 114 enters a chamber 314 causing depression of the plunger 114 and accordingly the presser members 115, 115A, 115B and 115C and the bulgers 116A and 116B. The pipe 307 is provided with a bypass 316 having positioned in it a ball 311 pressed against a seat 313 by a weak spring 315 which will readily yield to enable the ball to move from its seat when oil is forced from the chambers 314 in an opposite direction through the passage 280 by the action of the springs 290 upon the plunger 114. The valve formed by the ball 308, the seat 310 and the spring 312 may be referred to as a sequence valve since such valve does not open until oil in the pipe 264 has reached a predetermined pressure after the rods 268 have moved the side crease plates 80 to their operative positions.

The oil accumulator 262 has pivoted upon it an arm 318 (Figs. 1, 4 and 25) upon which is pivoted a piston 320 movable in a cylinder (not shown) of the accumulator to increase the oil pressure in the accumulator and to cause transfer of oil under heavy pressure through the pipe 260 for purposes above explained. The inner end of the arm 318 is yieldingly joined to the treadle 110 by a device comprising a threaded pin 322 which enters a housing 324 and has threaded onto its lower end a nut 326 having threaded onto it a screw 328 extending through an elongated slot 330 of the housing. A heavy spring 332 surrounding the pin 322 is interposed between the nut 326 and the upper end of the housing 324, the lower end of said housing being pivoted to a shackle 334 pivoted to the treadle 310. The treadle 110 is journaled at its rear end upon a pin 336 (Figs. 1 and 4) secured to the main frame 150, is vertically guided in a slot 338 in the main frame and is constantly urged toward the upper end of said slot by a spring 340 the lower end of which is attached to the treadle and the upper end of which is attached to the main frame.

Figure 2:
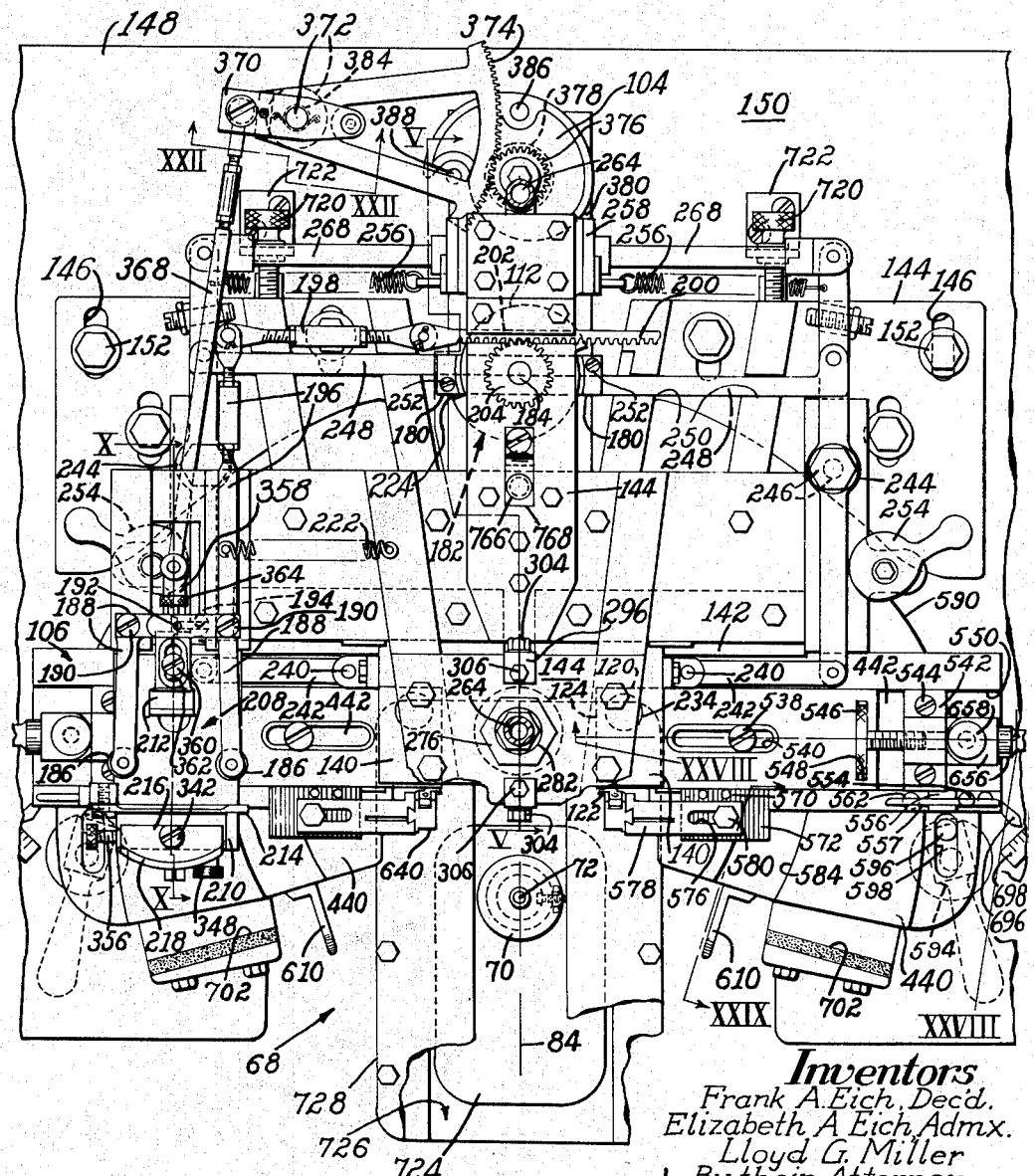
Fig. 2 is a plan view, partly broken away, of the machine.

As above explained, the heel is placed attaching face down against the surface 208 (Fig. 2) of the support 210 of the heel measuring gage 106, the breast of the heel in operating upon Louis work resting against the bar 214 and in operating upon Cuban work resting against the convex surface 218 of the plate 216. The illustrative machine is shown in Fig. 2 adjusted to accommodate Louis work but may be readily adjusted to accommodate Cuban work as shown in Fig. 10 by swinging the bar 214 aside and rotating the plate 216 180° from its position shown in Fig. 2. The plate 216 is mounted for rotation upon a shoulder screw 342 (Figs. 2, 3, 10 and 12) threaded into a slide 344 which is movable into different adjusted positions along a guideway 346 of the support 210. In setting up the machine to accommodate Cuban work the slide 344 is initially moved into its desired position in the guideway 346 of the support 210 by rotating a screw 348 which is threaded into the support and has a circular flange 350 (Fig. 10) fitting in a slot in the slide. The idle and operative positions (Figs. 2 and 10 respectively) of the plate 216 may be quickly determined by providing a spring-pressed pin 352 constructed and arranged to enter a V-shaped notch 354 in the bottom of the breast gage when the plate is in said idle and operative positions. The slide 344 is held in its adjusted position lengthwise of the guideway 346 by a manually operated set screw 356 threaded into the support 210 and engaging the slide.

The abutment 212 of the heel measuring gage 106 is adjustably secured to a slide 358 by a screw 360 which passes through an elongated slot 362 in the abutment and is threaded into the slide, a setting up adjustment between the abutment and the slide to accommodate Louis work being effected by rotating a screw 364 journaled in the slide and threaded into the abutment. The slide 358 has laterally extending flanges which fit in guideways 366 (Fig. 11) of the support 210 and is pivotally connected by an initially expansible rod 368 (Figs. 2 and 10) to a yoke 370 (Figs. 2 and 22) rotatably mounted upon a vertically disposed bearing pin 372 secured to the table top 148 of the main frame 150. Secured to the yoke 370 is a gear segment 374 (Fig. 2) which meshes with a gear 376 (Figs. 2, 6, 8 and 9) pinned to the spiral stop 104 which limits rearward movement of the back gage 92. The spiral stop 104 is rotatable upon a vertical bearing 378 secured to a bracket 380 of the main frame 150 by a screw 382 (Fig. 9). The yoke 370 is constantly urged counterclockwise as viewed from above (Fig. 2) by a coil spring 384 (Fig. 22) which encircles the bearing pin 372 and has its opposite ends attached to the pin and to the yoke. Counterclockwise movement of the yoke 370 and accordingly forward movement of the heel abutment 212 are limited by engagement of a pin 386 carried by the spiral stop 104 with a pin 388 secured to the bracket 380.

The back gage 92 for the counter portion of the shoe is mounted in a vertical guideway 390 of the carrier 88 and is held in its operative position shown in Fig. 9 in said guideway by a supporting spring 392 opposite ends of which are attached to the carrier and to a pin secured to the gage. Supported upon a rear portion of the carrier 88 and swiveled upon a pin 395 (Fig. 9) secured to the rear portion of the carrier 88 is the arrester 102, the rear face of which has formed in it a V-shaped slot 398 shaped and arranged to engage wedge faces 400 of the spiral stop 104 when the carrier is moved rearward under pressure of the shoe against the back gage 92. The arrester 102 has a bore 397 through which loosely passes a shoulder screw 396 threaded into the carrier 88, said arrester being normally held upon the carrier 88 in its idle position shown in Figs. 8 and 9 by a spring 402 which engages an outside surface of a sleeve portion 394 of the arrester, is coiled around a pin 404 and passes through a slot in said sleeve portion and engages the shoulder screw 396, the arrangement being such that the arrester may swing slightly about the pin 395 to cause the V-shaped slot 398 effectively to engage the wedge faces 400 of the spiral stop 104. The stop 104 is not of sufficient range to accommodate extremely large and small sizes of heels of different types and accordingly a main portion 406 of the carrier 88 which portion is slidable in lower guideways 403 of the bracket 380, has mounted upon it a pair of spring-pressed pins 408 one of which, after said main portion of the carrier has been slid along a front portion 406A of said carrier to vary the effective length of said carrier, engages in an associated hole 410 formed in said front portion of the carrier.

The centralizing fork 90 (Fig. 8) is slidable forward and rearward along upper guideways 414 of the bracket 380 and is constantly urged forward by the above-mentioned springs 100 which are housed in elongated bores 416 of the fork and have their rear ends in engagement with rods 418 formed integral with lugs secured by screws 420 to the bracket. The main portion 406 of the carrier 88 has threaded into it a screw 412 (Fig. 9) which is engaged by a cross bar 422 of the centralizing fork 90, said cross bar being constructed and arranged to engage said screw and to force, through the action of the springs 100, the carrier 88 forward until the arrester 102 engages a stop 424 secured to the bracket 380. As above explained, when the shoe, arranged bottom up and rear end away from the operator, is moved rearward as far as possible against the centralizing fork 90 and the back gage 92, the sides of the V-shaped slot 398 of the arrester 102 engage the wedge faces 400 of the spiral stop 104 which has previously been turned to a predetermined angularly adjusted position in accordance with the length of the attaching face of the heel in the heel measuring gage 106. The heel measuring mechanism and the shoe positioning mechanism above described are similar except for details of construction to corresponding mechanisms disclosed in said United States Letters Patent No. 2,277,076, and accordingly need not be further described herein.

The rear crease plate 82 has a flat bottom face 411 (Fig. 9) which engages and slides over the flat upper faces 86 of the side crease plates 80.

The edges 94, 96 of the side and rear crease plates, which are approximately continuous, form the U-shaped opening 98 (Figs. 13 and 16). The rear crease plate 82 is adjustably secured to the front portion 406A of the carrier 88 by screws 413 (Figs. 6, 8 and 9) which pass through elongated slots 415 in the rear crease plate and are threaded into said front portion of the carrier and serve to bind the rear crease plate in different adjusted positions to the carrier. It will thus be apparent that the operative positions of the back crease plate 82 lengthwise of the side crease plates 80 vary in accordance with the positions of the back gage 92 and accordingly the lengths of the heels in the heel measuring gage 106. Since the positions of the rear and side crease plates 82, 80 respectively, are dependent upon the length and the width of the heel in the heel measuring gage 106 it is apparent that the shape of the U-shaped opening 98 formed by their edges 94, 96, and accordingly the shape of the heel seat tabs 46, 46A formed upon the attached outsoles 42 of the shoes 44, will vary in accordance with the length and width of the attaching face of the heel in the heel measuring gage.

The tab and shoulder forming knives 120, 122 (Fig. 6) are operated by levers 426 (Figs. 1, 4 and 24) each of which, as will be hereinafter explained, is fulcrumed at one or the other of two different positions upon the main frame 150 in accordance with whether the machine is to operate upon Louis or Cuban work.

When the heel seat portion 40 of the outsole 42 of the shoe 44 has been clamped and bulged (Figs. 16 and 17) or distorted through hydraulic transmission means above described, the operator further depresses the treadle 110 against the action of the treadle spring 340 and against the action of the spring 332 (Fig. 25) which operatively connects the arm 318 to the treadle, until a screw 427 (Figs. 1 and 4) in a lug of the treadle engages the enlarged end of an arm 428. The arm 428 is pivoted upon a collar screw 430 in the right front leg of the main frame 150, and is swung counterclockwise (Fig. 1) to operate, through mechanism which will be presently described, the one-revolution clutch 118 at the rear to actuate the levers 426.

The levers 426 are operated through cams 432, 432A which are secured to shafts 434, 436, respectively, rotatably mounted in bearings 438 (Fig. 4) of the main frame 150. These levers are operatively connected by mechanism hereinafter described to a carrier block 440 when the machine is set for Cuban work as shown in Fig. 6 or directly to a knife carrier 442 when the machine is set for Louis work as shown in Figs. 2 and 28. As will be explained, the transverse throws of the tab and shoulder forming knives 120, 122 during their operation on Cuban and Louis work are different, the changing of said throws of the knives, as will be explained later, being effected by changing the positions at which the levers 426 are fulcrumed on the main frame 150.

The mechanism for driving the machine is positioned beneath the table top 148 of the main frame 150. Rotatably mounted upon a platform 444 (Fig. 1) supported by the main frame 150 is an electric motor 446 which drives through a belt 448, a pulley 450 which is secured to a shaft 452 rotatable in bearings (not shown) on the main frame. Also secured to the shaft 452 is a small pulley 454 which drives through a belt 456 a pulley 458 rotatable on the shaft 434.

The treadle-operated arm 428 (Figs. 1 and 4) is operatively connected through linkages 462 to an arm 464 pinned to a shaft 466 journaled in bearings of the main frame 150, said arm 464 being constantly urged counterclockwise (Fig. 1) by a spring 468, the lower end of which is attached to the arm and the upper end of which is attached to the main frame 150. Secured to the rear end of the shaft 466 (Fig. 4) is an arm 470 connected through a link 472 to a trip arm 474 of the clutch 118 which serves operatively to connect and disconnect the shaft 434 to and from the continuously rotating pulley 458.

The shaft 434 has secured to it a gear 476 meshing with a gear 478 secured to the shaft 436. Secured to the forward ends of the shafts 434, 436 are the cams 432, 432A having operating faces 480, 480A against which are forced cam rolls 482 carried by followers 484 supported by links 486 which are fulcrumed on pins 488 (Fig. 1) secured to the main frame 150 and are also supported by the knife operating levers 426 which in operating upon Louis work are in their positions illustrated in Fig. 2 in which positions bores 490 (Figs. 1 and 24) of the lever are in register with bores 492 formed in the main frame 150. Associated bores 490, 492 of the lever 426 and the main frame 150 are held in register by bearing pins 494, which are slidable in said bores 492 and have their rear ends pivoted to hand levers 496 mounted for swinging movement upon pins 498 supported by bifurcated brackets 500 of the main frame 150. The rolls 482 of the cam followers 484 are constantly forced against the faces 480, 480A of the cams 432, 432A by a spring 502 opposite ends of which are attached to studs 504 secured to the lower ends of the levers 426. Pivoted to the lower end of each of the hand levers 496 is another pin 506 which is slidable in alined bores 508 of the main frame 150. When the machine is to operate upon Cuban work it is necessary to increase the strokes of the tab and shoulder forming knives 120, 122 and accordingly the levers 426 are swung into positions in which bores 510 formed therein are in register with corresponding bores 508 in the main frame 150, the upper ends of the levers 496 being swung to rearward positions (Fig. 24) forcing the bearing pins 506 into the bores 510. The levers 496 are held in their forward and rearward operating positions in operating upon Louis and Cuban work respectively by spring-pressed plungers 512 carried by the associated levers and constructed and arranged to register in either of two holes 514 in the main frame 150 to hold said levers in one or the other of their operating positions.

In order to turn the machine over by hand for setting up purposes including the alining of the bores 490, 510 of the levers 426 with the pins 494, 506 preparatory to changing from one type of work to another, there is rotatably mounted in the main frame 150 a shaft 516 (Fig. 1) which has secured to it a small gear 518 meshing with the gear 476 and which is conveniently rotated by a handle (not shown) slidable onto a shouldered forward portion 520 (Fig. 4) of the shaft.

Figure 32:
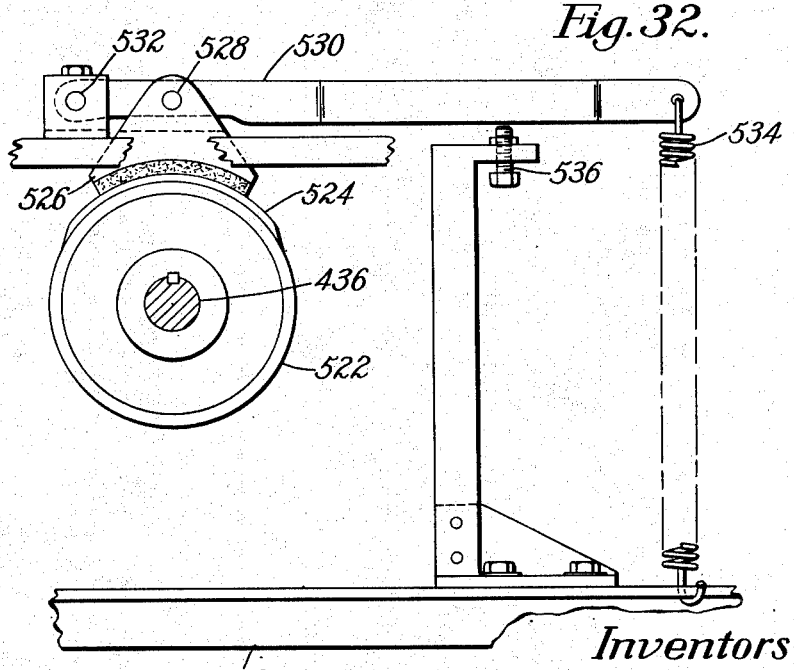
Fig. 32 is a section on line XXXII—XXXII of Fig. 4 showing braking mechanism for stopping power operated portions of the machine at the end of their operating cycle.

In order to insure that the machine is stopped in the proper position after the one-revolution clutch 118 has been disengaged there is keyed to the rear end of the shaft 436 a drum 522 (Figs. 4 and 32) having a high peripheral portion 524 which, when the machine is stopped, is in forced engagement with a brake shoe 526 pivoted upon a pin 528 secured to an arm 530 fulcrumed on a pin 532 secured to the main frame 150. The arm 530 is constantly urged clockwise as viewed in Fig. 32 by a spring 534, clockwise movement of the arm being limited by an adjustable stop 536. As soon as the clutch 118 is engaged the high peripheral portion 524 of the drum 522 moves away from the brake shoe 526 and at the end of the machine cycle again moves into engagement with the brake shoe to cause the knife actuating mechanism of the machine to come to rest.

Each of the tab forming knives 120 is secured to an associated carrier 442 by a screw 538 (Figs. 2, 6, 23 and 28) which passes through an elongated slot 540 in the knife and is threaded into the carrier. Each carrier 442 comprises a cross piece 542 secured to the main body of the carrier by screws 544 and threaded into the cross piece is an adjusting screw 546 an enlarged head of which fits in a slot 548 of the knife. The knives 120 may be moved into different adjusted positions in the carriers 442 after releasing the screws 538, by turning the screws 546, the screws 538 then being tightened to secure the knives to the carriers.

When the machine is adjusted to accommodate Louis work the carrier 442 is mounted for movement in a rectilinear guideway 550 formed in a platform 552 which is then held stationary by mechanism hereinafter described. Secured by screws 554 (Figs. 2, 6 and 7) to the carrier 442 is a lug 556 upon which is pivoted a lever 557 (Fig. 7) having an elongated recess 558 for receiving a stud 560 secured to a pin 562 slidable in a hole 564 in the carrier 442. When the machine is adjusted for Cuban work the pin 562 extends into a hole 566 in the platform 552 and when the machine is adjusted for Louis work the pin 562 is withdrawn from the hole 566, a spring 568 bearing against the lever 557 frictionally holding the lever in its adjusted position.

Each of the knife carriers 442 has secured to it by screws 570 (Fig. 23) a ledge 572 having a serrated upper face and an elongated slot 574. Passing through the slot 574 and through an elongated slot 576 in a holder 578 upon the ledge 572 is a screw 580 onto the lower end of which is threaded a nut 581 which is tightened to secure the holder in different adjusted positions upon the ledge.

Each platform 552 has a depending dovetail tongue 582 (Figs. 3, 28 and 29) fitting in a short arcuate dovetail guideway 584 of the carrier block 440 which has a dovetail tongue 586 (Figs. 27 and 28) slidingly fitting in a long circular dovetail guideway or guide 588 formed in a segment plate 590 pivoted upon a shouldered screw 592 (Figs. 6 and 28) threaded into the table top 148 of the main frame 150. For purposes which will be hereinafter explained the segment plates 590 are movable into different angularly adjusted positions about the screws 592 by rotating cranks 594 which are mounted in the table top 148 of the main frame 150 and have at their upper ends studs 596 fitting in elongated recesses 598 of the segment plates 590, the segment plates being secured in their adjusted positions by screws 600 (Fig. 6) threaded into said table top and passing through arcuate slots 602 in the segment plates.

When the machine is operating upon Louis work the platform 552 is secured to the associated carrier block 440 and the carrier block is secured to the associated segment plate 590, the rectilinear guideway 550 of the platform 552 being disposed at right angles to the central heightwise plane 84 of the platen 78 and the machine. A device to join the platform 552 and the carrier block 440 is shown in Fig. 29 and comprises a bifurcated lug 606 secured by screws 604 to the bottom of the carrier block 440. This lug 606 has secured to it a pin 608 upon which is fulcrumed a lever 610 arranged in a recess 612 of a plunger 614 extending into a hole 616 of the carrier block. Formed in the platform 552 is a hole 618 (Figs. 6 and 29) which for Louis work is in register with the hole 616, the pin 614 entering both holes by the action of the lever 610 which is constantly urged clockwise as viewed in Fig. 29 by a spring 620. Further, for Louis work the carrier block 440 is also secured against movement in the long dovetail guideway 588 of the segment plate 590 by a spring-pressed plunger 622 (Fig. 27). Each of the segment plates 590 has force fitted into it a bushing 624 (Figs. 1, 3 and 27) which extends downward through an arcuate slot 626 in the table top 148 of the main frame 150. Slidingly fitting in the bushing 624 is the plunger 622, a shank portion of which extends through a bore 628 in the bushing and is pinned to a knurled head 630, a spring 632 being interposed between the plunger and the bushing. When the head 630 is positioned as shown in Fig. 27 with its flange portion extending into a notch 634 of the bushing, the plunger 622 enters a hole 636 of the carrier block 440. For a purpose to be hereinafter explained, the plunger 622 may be withdrawn from the hole 636 of the carrier block 440 by pulling the head 630 against the action of the spring 632 and rotating the plunger so that the upper end of its flange portion engages the lower end of the bushing 624. The platform 552 and the carrier block 440 together with the holder 442 may be referred to as mounts or connectors.

Figure 35:
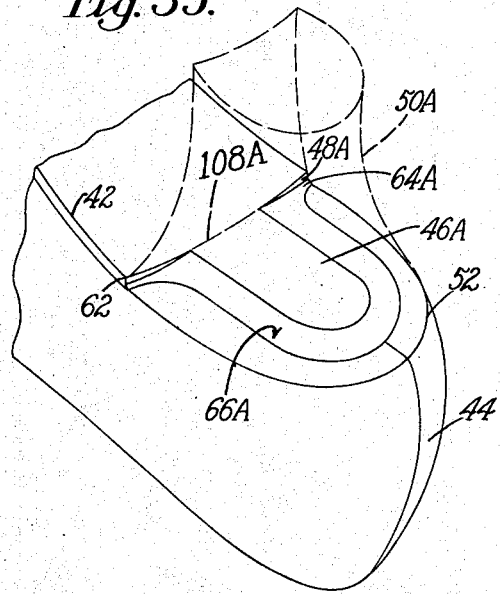
Figs. 34 and 35 show in perspective the rear ends of the shoe shown in Fig. 33 fitted for the reception of Louis and Cuban heels respectively.
Figures 33, 34:
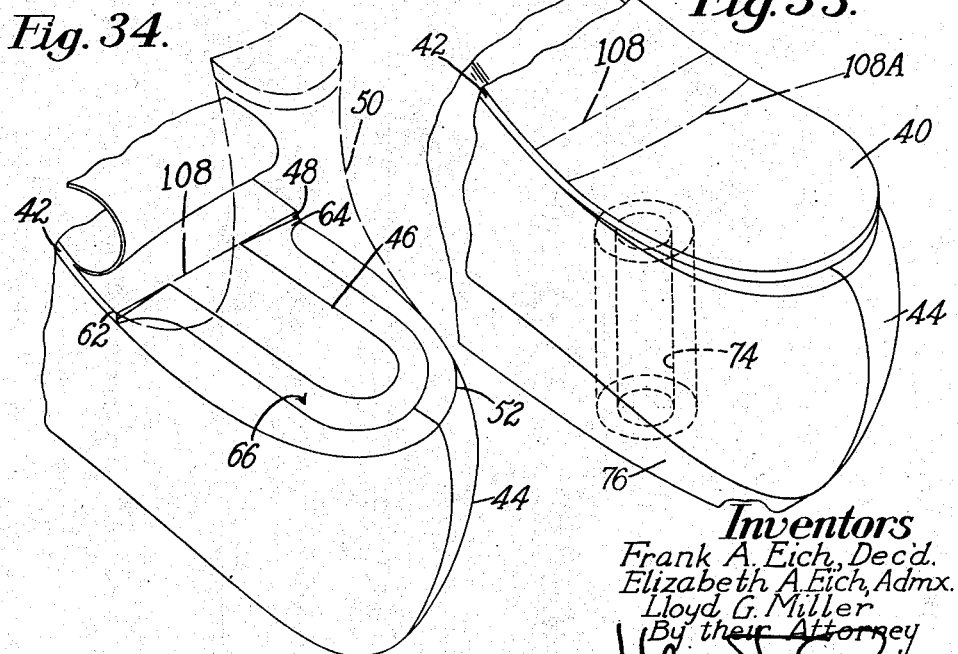
Fig. 33 shows in perspective the heel end of a shoe which is mounted upon a last and is ready to have its heel seat fitted for the reception of a Cuban or a Louis heel.

The knife holders 578 are provided with split portions terminating in dovetail slots 638 (Figs. 6 and 23) for receiving bars 640 to which the shoulder forming knives 122 are secured by screws 642. The bars 640 are normally clamped in the dovetail slots 638 by a screw 644. In operating upon Louis work (Fig. 2) the tab and shoulder forming knives 120, 122 travel transversely along the rectilinear guideways 550, the cutting edges 124 of the tab forming knives 120 sliding along flat bottom faces 646 (Fig. 17) of associated side crease plates 80 and into and through the deformed outsole along the line 128. The upstanding edge 126 of each of the shoulder forming knives 122 is substantially continuous with the cutting edge 124 of the associated tab forming knife 120 and during the inward movement of the carrier 442 moves in a path which is approximately parallel and in close proximity to a front edge 650 (Figs. 13, 14 and 16) of an associated side crease plate. As best shown in Fig. 16 the front presser members 115 are rounded and force the forward lateral parts of the heel seat portion 40 of the outsole 42 against rounded edge portions 652 of the platen 78, said edge portion being extremely thin and slightly beveled downwardly both inwardly of the shoe and forwardly with the result that the outsole just forward of such portions is flexed downward slightly by said pressers 115 so that the cutting edges 124, 126 of the tab and shoulder forming knives 120, 122, in operating upon the outsole, form the fillets 64 or 64A (Figs. 34 and 35) which are thin at the outer edges of the outsole and which, as above explained, in the finished shoe are engaged by the forward lateral corners of the attaching face of the heel to insure against the rear lateral portions of the shank of the outsole of the shoe sagging away from the shoe upper. The cutting edges 124, 126 of the tab and shoulder forming knives 120, 122 are substantially continuous and each of the tab forming knives and its associated shoulder forming knife may be described as constituting a knife having a cutting edge a portion of which is movable along the face 646 of an associated crease plate 80 and another portion of which is disposed at an angle to such face and travels along a forward edge of the crease plate.

Each of the knife carriers 442 is joined to one of the cam operated laterally movable levers 426, to impart a cutting movement to the associated knives 120, 122 by a connecting unit 668 which is a link of adjustable length. To this end, each carrier 442 has a flange 654 (Fig. 28) which interfits with a bifurcated portion of a universal coupling 656 and which is pivotally connected to the coupling by a pin 658 passing through alined bores 660, 662 in the carrier 442 and the coupling 656. Pinned to the coupling 656 is a bar 664 (Figs. 24 and 26) which fits in a passage 666 of the connecting unit 668 and has a plurality of recesses 670 any one of which is constructed and arranged to receive a pin 672 pivotally connected to a lever 674 fulcrumed upon a stud 676 carried by a bracket 678 secured to and forming part of the connecting unit. The lever 674 is constantly urged clockwise as viewed in Fig. 26 by a spring 680 to retain the pin 672 in one of the recesses 670.

Swiveled in a cylindrical recess 682 (Fig. 1) at the upper end of each of the levers 426 is a coupling 684 comprising a plate 686 (Fig. 26) which has formed integral with it a pin 688 fitting in a bore 690 of the connecting unit 668 and which has a notch 692 for receiving a flange 694 of said unit. As above explained, when the machine is operating upon Louis work the levers 426 are in their adjusted positions illustrated in Fig. 1, swinging movement of the upper ends of the levers effecting through the above described mechanism transverse movement of the carriers 442 along the rectilinear guideways 550 and accordingly transverse movement of the tab and shoulder forming knives 120, 122 to trim the horseshoe shaped chip from the outsole. The inner ends of the paths of travel of the pairs of tab and shoulder forming knives 120, 122 overlap slightly and accordingly one of the pairs of knives has a slight lead over the other and is withdrawn as the other pair of knives approaches the inner end of its cutting stroke. Such movement is effected by giving the cam 432 a slight angular advance over the cam 432A.

When the machine is set for Cuban work the cutting edges 124, 126 of the tab and shoulder forming knives 120, 122 are moved in the circular paths 132, 134 (Fig. 6) the radius of curvature of the paths 134 being approximately equal to the transverse curvatures of the breasts of the heels to be attached to the shoes, such transverse curvature being constant and approximately 1⅞″. When the segment plates 590 are positioned upon the table top 148 of the main frame 150 with pointers 696 (Figs. 2 and 6) attached to the plates arranged opposite zero degrees on scales 698 secured to the table top, the dovetail guideways 588 of the segment plates 590 are centered about a vertical axis 700 lying in the central heightwise plane 84 of the platen 78 and the machine, the distance between the axis and the path 134 being approximately 1⅞″.

As above explained, when the machine is adjusted for Louis work, the pins 562 (Figs. 2, 3, 6 and 7) are withdrawn from their associated recesses 556 of the platforms 552 so as to enable the knife carriers 442 to be moved in rectilinear paths transversely along the guideways 550 of the platforms, said platforms at such time being held in their positions shown in Fig. 28 by the plungers 614 (Figs. 6 and 29) fitting in the holes 618 of the platforms. When the machine is adjusted for Louis work each of the spring-pressed plungers 622 (Fig. 27) extends into the hole 636 of the associated carrier block 440 to secure said block to the segment plate 590 which is secured to the table top 148 in its operative position by the screw 600.

In order to adjust the machine for operation upon Cuban work the pins 658 (Fig. 28) are removed temporarily to disconnect the operating levers 426 from the knife carriers 442 and the knife carriers are locked to the platforms by pins 562. The platforms 552 are then swung forward along the arcuate grooves 584 of the carrier block 440 to their positions shown in Fig. 6 against upstanding abutments 702 (Figs. 2, 3 and 6) secured to the table top 148, said platforms being retained in such positions by the pins 614 (Fig. 29) which enter holes 704 of the arcuate platforms and are released by the levers 610. After moving the platforms 552 to their forward operating positions the spring-pressed plungers 622 (Fig. 27) beneath the table are withdrawn from the holes 636 of the carrier blocks 440 and are turned 90° to cause the upper edges of the heads 630 of the plungers to engage the rims of the bushings 624, thereby holding the plungers out of the holes and thus enabling the carrier blocks 440 to be moved along the dovetail guideways 588 of the segment blocks 590.

At its outer rear corner, each of the carrier blocks 440 has secured to it a lug 706 which has a bore 708 and corresponds to the flange 654 of the carrier 442, said lug being constructed and arranged to be operatively connected to the coupling 656 by the pin 658. As above explained, when the machine is adjusted to operate upon Cuban work the levers 426 have their bores 510 (Figs. 1 and 24) in register with bores 508 of the main frame 150, the pins 506 pivoted to the lower ends of the hand levers 496 serving as fulcrum pins about which the levers are swung by the action of the cams 432, 432A on the cam followers 484. The distances between the upper ends of the levers 426 and the lugs 706 are greater when the machine is adjusted for Cuban work than the distances between the upper ends of the levers 426 and the flanges 654 of the carrier 442 when the machine is adjusted for Louis work. Accordingly, connecting units 668 longer than those shown in Fig. 26 are used in operating upon Cuban work or if desirable the bars 664 can be adjusted in the connecting units effectively to bridge the distances between the upper ends of the levers 426 and the lugs 706 of the carrier blocks 440.

In operating upon Cuban work it is desirable that all points on the cutting edges 126 of the shoulder forming knives 122 shall move substantially in circles such as 132, 134 (Fig. 6) of approximately 1⅞" radius, said circles being centered approximately about the vertical axis 700 (Fig. 6) about which the guideways 588 of the segment plates 590 are centered. In operating upon Louis work the lower ends of the cutting edges 126 of the shoulder forming knives 122 move along the horizontal line or path of movement 130 (Figs. 16 and 30) which is located just forward of the front edges 650 of the side crease plates 80. In order effectively to form the fillets 64, 64A in fitting the heel seat portions of attached outsoles of shoes for the reception of Louis and Cuban heels it is desirable that the paths of movement 130, 134 of the lower ends of the cutting edges 126 of the shoulder forming knives 122 shall just miss the front edges 650 of the crease plates 80 adjacent to the entrance of the U-shaped opening 98.

When the illustrative machine is adjusted for Louis work and is at rest the lower ends of the cutting edges 126 of the shoulder forming knives 122 are positioned at points 710 (Fig. 30) for example on the path or line 130. In order to adjust the machine operating upon Louis work to operate upon Cuban work it is necessary to move the tab and shoulder forming knives 120, 122 into positions in which faces 712 of the shoulder forming knives 122 are approximately tangent to the circular path 134 and in which the lower ends of the cutting edges 126 lie in said path. In changing over from Louis to Cuban work the platforms 552 are angularly adjusted along the guideways 584 of the carrier blocks 440 from positions (Fig. 2) in which the plungers 614 are in engagement in the holes 618 to positions (Fig. 6) in which said plungers are in engagement with the holes 704. The guideways 584 of the carrier blocks 440 are centered about points 713 (Fig. 30) and when the above adjustment is effected, the tab and shoulder forming knives 120, 122 move from positions in which the faces 712 of the shoulder forming knives 122 lie along the rectilinear path of movement 130 and the lower ends of the cutting edges 126 of the knives 122 lie in said path 130 to positions in which the faces 712 of the shoulder forming knives 122 are tangent to the circular path 134 and the lower ends of the cutting edges 126 of said shoulder forming knives 122 lie in said path 134. In effecting the above-mentioned changeover from Louis to Cuban work it is necessary to mount the tab and shoulder forming knives 120, 122 for movement in paths which are so controlled that the lower ends of the cutting edges 126 of the shoulder forming knives 122 during their inward travel shall move along the circular path 134, the cutting edges 124 of the tab forming knives 120 moving in the circular paths 132 (Fig. 6) along the flat bottom faces 646 (Fig. 17) of the side crease plates 80. As above explained the dovetail guideways 588 of the segment plates 590 are centered about the axis 700 and when the carrier blocks 440 travel along the guideways 588 the lower ends of the cutting edges 126 of the shoulder forming knives 122 travel in the circular path 134 to form heel breast receiving shoulders 48A.

As above explained, when the carrier blocks 440 are set in fixed positions for operating upon Louis work with the plungers 614 carried by the blocks extending into the holes 618 of the platforms 552, the lower ends of the cutting edges 126 of the shoulder forming knives 122 lie in the path 130. When the platforms 552 have been swung along the dovetail guideways 584 of the carrier blocks 440 to their positions shown in Fig. 6 in which the plungers 614 carried by the blocks 440 extend into the holes 704 of said platforms the knives 120, 122, which are then rigidly secured through mechanism shown in Fig. 7 to the platforms 552 and through the pins 614 to the carrier blocks 440, are so arranged that when the carrier blocks 440 are moved along the dovetail guideways 588 of the segment plates 590 the lower ends of the cutting edges 126 of the shoulder forming knives 122 travel in the circular paths 134 to form the heel breast receiving shoulders 48A and the cutting edges 124 of the tab forming knives 120 move in the circular paths 132 along the bottom faces 646 (Fig. 17) of the side crease plates 80 to form the heel seat tabs 46A which include the fillets 64A.

In changing over from Louis to Cuban work and in operating upon Cuban work the sizes of which vary materially it is usually desirable, in order to prevent interference between the shoulder forming knives 122 and the side crease plates 80 and in order that said plates shall be desirably placed with relation to the paths of movement 130, 134 of the shoulder forming knives, to move forward or rearward to a slight extent the side crease plates 80 and the various mechanisms which cooperate therewith in clamping and deforming the heel seat portion of the outsole. Such forward or rearward adjustment of the side crease plates 80 or adjustment of the crease plates lengthwise of the U-shaped opening 98 is usually very slight and is effected by moving the head 144 forward or rearward upon the table top 148 of the main frame 150, after releasing the screws 152 (Figs. 2 and 6), which are threaded into the table top 148 and pass through the slots 146 in the head. The head 144 is moved forward or rearward into different positions by turning screws 720 which are rotatably mounted in lugs 722 secured to the table top 148 and which are threaded into the head. After the head 144 has been properly adjusted the screws 152 are again tightened to retain the head in its adjusted position. It will be apparent (Fig. 30) that the paths of movement 134 of the shoulder forming knives move forward as they move away from the plane 84. Accordingly when the crease plates 80 are set to fit heel seats for the reception of Cuban heels of materially different widths, said crease plates should be initially set lengthwise of the U-shaped opening 98 into positions adjacent to opposed portions of the paths of movements of the shoulder forming knives.

In Fig. 6 the dovetail guideways 588 of the segment plates 590 at opposite sides of the central heightwise plane 84 of the machine are illustrated as centered about the axis 700 which may be described as lying in said plane and as extending heightwise of the shoe and positioned a substantial distance forward of the heel breast line 108A (Figs. 34 and 35) of the attached outsole 42 of a shoe 44 positioned in the machine.

As is well known to those skilled in the art, there is a tendency for the outer ends of heel breast receiving shoulders 48, 48A of the outsoles 42 of the shoes 44 to "creep" forward in shoes the attached outsoles of which are sharply convex transversely of the shoes. Accordingly, when such shoes are fitted the above-mentioned creeping should be compensated for. Otherwise a gap is likely to be formed in the finished shoe between the outer ends of the heel breast receiving shoulders and the breast of the heel. In order to compensate for such creeping in the illustrative machine the segment plates 590 are moved outward into different angularly adjusted positions from their positions shown in Fig. 6 so as to shift the outer ends of the heel breast receiving shoulders formed without materially changing the positions of the inner ends of said shoulders.

It will be apparent that when the machine is adjusted as illustrated in Fig. 6 the guideways 588 are centered about the common axis 700. However, because of the above-mentioned forward creeping of the outer portions of the heel breast receiving shoulders in the finished shoe the segment plates 590 are usually swung about their pivot screws 592 into adjusted positions slightly out and displaced generally lengthwise of the outsole from their positions illustrated in Fig. 6. When the segment plates 590 are thus adjusted the guideways 588 at opposite sides of the central heightwise plane 84 are actually centered about separate axes which are positioned slightly rearward and at opposite sides of the axis 700 and which may be described as extending generally heightwise of the shoe positioned and clamped in the machine and as being arranged substantial distances forward of the heel breast line of the shoe and in the vicinity of the central heightwise plane of the machine and of the sole of the shoe being operated upon. When the segment plates are swung into different positions about their pivot screws 592 (Fig. 6) the positions of the axes about which the circular guideways are centered will be changed with relation to the central heightwise plane 84 and the paths of movement of the shoulder forming knives will be varied. The axes of the pivot screws 592 may be described as extending heightwise of the shoe and as being positioned substantial distances rearward of said shoe and at short distances at opposite sides of said central heightwise plane 84 of the shoe.

The pedestal 70 (Figs. 1 and 2) of the work support 68 has a base 724 which is slidable upon a flat surface 726 of a mount 728 a depending flange of which is slidable, for purposes of varying the heightwise position of the support, in a guideway 730 (Fig. 1) of a bracket 732 secured to the main frame 150. Threaded into the main frame 150 and passing through a slot 734 in the depending flange of the mount 728 is a manually operated clamping member 736. Rotatably mounted in the bracket 732 and threaded into said flange is a screw 738 which after the clamping member has been released may be turned to raise or lower the support 68 to its desired heightwise position. When the support 68 has been adjusted heightwise to the desired position the clamping member 736 is again turned to bind the mount 728 to the main frame 150. As heretofore explained the operators usually prefer to present the shoe by hand to the machine rather than to use the work support 68.

In order to remove from the machine the horseshoe shaped chip trimmed from the heel seat portion 40 of the attached outsole 42 of the shoe 44 there is provided an ejector 740 which is best shown in Fig. 5. The ejector 740 comprises an ejecting member 742 which is pivoted upon a pin 744 mounted upon a rack 746 and is normally held by a spring 748, in its lowered position in which a shoulder (not shown) thereof is in engagement with a shoulder (not shown) of the rack. The rack 746, which may be referred to as a spring actuated carrier or slide, is slidable along a guideway 750 of the head 144 and meshes with a gear 752 secured to a shaft 754 rotatable in the head. Also secured to the shaft 754 is a second gear 756 which meshes with a vertical rack 758 slidingly movable in a guideway 760 of the head 144 and pivotally connected to a rod 762 the upper end of which is slidable in a bore 764 of a guide 766 threaded into a bracket 768 secured to the head. Surrounding the rod 762 and interposed between a head of the rod and the guide 766 is a coil spring 770 which constantly urges the rod downward and the ejecting member 742 forward, downward movement of the rod being limited by the engagement of the rod with a shoulder 772 of the head 144. The rack 758 and the spring operated rod 762 may be referred to as an actuator. The ejecting member 742 has a front concave face 774 which is engaged by the rear end of the attached outsole 42 of the shoe 44 as the shoe is positioned in the machine. While the shoe 44 is being moved rearward in the machine to its proper position to have its outsole 42 trimmed the ejecting member 742 is moved rearward by the outsole to a cocked position against the action of the spring 770, said member turning slightly upon the pin 744 if necessary to follow the outsole and to insure that the outsole shall not "run off" the face 774. As the shoe is removed from the machine the ejecting member 742 acted upon by the spring 770 and through the above described mechanism moves forward to push the chip off the front end of the platen 78.

After effecting the necessary setting up adjustments to adapt the machine for operating upon Cuban or Louis work and placing the heel to be attached to the shoe in the heel measuring gage 106 the operator presents the shoe, bottom up and heel end away from the operator, to the machine. As the shoe is presented to the machine the side crease plates 80 then held stationary in their retracted positions engage in opposite sides of the rand crease of the shoe, the counter portion of the shoe first engaging the centralizing fork 90 to position the rear end of the shoe widthwise and then the back gage 92 which is slid rearward together with the centralizing fork under pressure of the shoe, rearward movement of the back gage being arrested by the spiral stop 104 set in accordance with the length of the attaching face of the heel in the heel measuring gage. The heel in the heel measuring gage 106 also positions the spiral stop cam 112 which is automatically adjusted in accordance with the width of said heel.

After having positioned the shoe in the machine the operator while maintaining his grip on the toe end of the shoe depresses the treadle 110 causing inward movement of the side crease plates 80 until the abutments 180 operatively connected to said crease plates engage the stop cam 112. Continued depression of the treadle 110 causes downward movement of the presser members 115, 115A, 115B and 115C to clamp the heel seat portion of the outsole of the shoe against margins of the platen 78 surrounding the U-shaped opening 98 and thereafter causes the bulgers 116A and 116B to force the central part of the heel seat portion of the outsole through the U-shaped opening to its position shown in Fig. 17.

After insuring that the heel seat portion of the outsole of the shoe has been correctly positioned, clamped and distorted in the machine the treadle 110 is further depressed to trip the one-revolution clutch 118 causing the tab and shoulder forming knives 120, 122 to move inward from opposite sides of the shoe to form the heel seat tab 46, 46A and the heel breast receiving shoulders 48, 48A, said machine coming to rest after said knives have returned to their starting positions. The operator then releases the treadle 110 with the result that the carrier slides 156, 156A, 156B and 156C are raised to their idle starting positions, and the side crease plates are retracted, the shoe being thus released and removed from the machine.

As the shoe is positioned in the machine the operator forces the rear end of the heel seat portion of the outsole of the shoe against the ejector member 742 in opposition to the spring 770 and when the horseshoe shaped clip has been trimmed from the outsole and has been released by the presser members 115, 115A, 115B and 115C said chip, as the shoe is removed from the machine, is spring forced by the ejector member off the forward end of the platen 78.

Having thus described the invention, what is claimed as new and desired to be secured by Letters Patent of the United States is:

1. In a heel seat fitting machine, a platen having a U-shaped opening, means for forcing the central part of a heel seat portion of an outsole through said opening and beyond a face of the platen, and knives movable inward from opposite sides of the outsole to trim material from the heel seat portion of the outsole and to form on said heel seat portion a heel seat tab and a pair of heel breast receiving shoulders, each of said knives having a cutting edge a portion of which is movable along said face of the platen and another portion of which is disposed at an angle to said face and is restrained for movement along a forward edge of said platen.

2. In a heel seat fitting machine, a platen having a U-shaped opening comprising flaring forward lateral ends, means for forcing the margin of a heel seat portion of an outsole against portions of the platen bordering the U-shaped opening including said flaring lateral ends, means for forcing the central part of the heel seat portion of the outsole through the opening and beyond a face of said platen, and knives movable inward from opposite sides of the outsole to trim material from the heel seat portion of the outsole and to form on said heel seat portion a heel seat tab and a pair of heel breast receiving shoulders, each of said knives having a cutting edge a portion of which is movable along said face of the platen and another portion of which is disposed at an angle to said face and travels along a forward edge of said platen.

3. In a heel seat fitting machine, a platen having a U-shaped opening and faces terminating in edges which define portions of said opening, means for forcing the central part of a heel seat portion of an outsole of a shoe through said opening and beyond said faces of the platen, pairs of knives movable inward from opposite sides of the shoe along said faces to form a heel seat tab, means for forming heel breast receiving shoulders on the outsole and means for moving said knives in timed relation to one another in paths inner portions of which overlap.

4. In a heel seat fitting machine, a platen comprising a pair of crease plates which are movable toward and away from each other and have opposing edges forming an opening, a gage for measuring a heel widthwise, means for moving the crease plates toward each other to operating positions determined by the width of the heel in the heel gage, means for forcing the central part of the heel seat portion of an outsole through said opening, and knives movable transversely of the outsole to form on the outsole a heel seat tab and heel breast receiving shoulders.

5. In a heel seat fitting machine, a platen comprising crease plates having spaced opposing edges forming between them an opening, heel seat reducing and shoulder forming knives, bulgers, said plates being movable toward and away from each other to vary the width of said opening, means comprising manually actuated hydraulic pressure transmission means for moving the crease plates toward each other and for thereafter actuating said bulgers to force the central part of a heel seat portion of an outsole through said opening, and power operated means for moving said knives to reduce the heel seat portion of the outsole and to form heel breast receiving shoulders upon said outsole.

6. In a heel seat fitting machine, means for trimming a heel seat portion of an outsole of a shoe to fit said shoe for the reception of a heel, a pair of circular guideways which are centered about axes disposed heightwise of the shoe and are arranged substantial distances forward of the heel breast line of the outsole of the shoe, said trimming means comprising knives which are movable along said circular guideways, means for moving the knives along said guideways to form heel breast receiving shoulders upon the outsole, and means for moving said circular guideways into different adjusted positions to shift the outer portions of the heel breast receiving shoulders forward or rearward of the outsole of the shoe without substantially changing the positions of the inner portions of said shoulders.

7. In a heel seat fitting machine, a platen for supporting a heel seat portion of an outsole of a shoe, means for trimming said heel seat portion of the outsole supported by said platen to fit the shoe for the reception of a heel, said means comprising shoulder forming knives having cutting edges, rectilinear guideways for controlling movement of the knives in paths disposed substantially at right angles to a heightwise median plane of the platen, circular guideways for controlling movement of the knives in curved paths extending transversely of the outsole about axes which lie in the vicinity of said plane and which extend heightwise of the shoe and are arranged substantial distances forward of a heel breast line of the outsole, means for effecting angular bodily setting up adjustments of the knives between positions in which faces of the knives, which faces include the cutting edges of said knives, are parallel to and are movable along the rectilinear guideways for operation upon Louis work and positions in which said faces are tagent to, and said cutting edges lie in and are movable along said curved paths for operation upon Cuban work, and means for selectively operating the knives in said rectilinear or said curved paths to form upon the outsoles heel breast receiving shoulders shaped and arranged for the reception of Louis and Cuban heels respectively.

8. In a heel seat fitting machine, a platen for supporting a heel seat portion of an outsole of a shoe, said platen having a U-shaped opening and comprising side crease plates edges of which define the sides of said opening, means for trimming the heel seat portion of the outsole supported by said platen to fit the shoe for the reception of a heel, said means comprising shoulder forming knives having cutting edges, rectilinear guideways for controlling movement of the knives in paths disposed at substantially right angles to a heightwise median plane of the platen, circular guideways for controlling movement of the knives in curved paths extending transversely of the outsole about axes which lie in the vicinity of said plane and which extend heightwise of the shoe and are arranged substantial distances forward of a heel breast line of the outsole, means for effecting angular bodily setting up adjustments of the knives between positions in which faces of the knives, which faces include cutting edges of the knives, are substantially parallel to and are movable along said rectilinear guideways for operating upon Louis work and positions in which said faces are tangent to and the cutting edges lie in and are movable along said curved paths for operation upon Cuban work, and means for selectively operating the knives in said rectilinear or said curved paths to form upon the outsole heel breast receiving shoulders shaped and arranged for the reception of Louis or Cuban heels respectively, said platen being adjustable lengthwise of the U-shaped opening of the platen relatively to said guideways to move forward edges of the side crease plates into different positions adjacent to the rectilinear or curved paths of movement of the shoulder forming knives.

9. In a heel seat fitting machine, a platen for supporting a heel seat portion of an outsole of a shoe, said platen having a U-shaped opening and comprising side crease plates edges of which define the sides of said opening, means for trimming the heel seat portion of the outsole to fit the shoe for the reception of a heel, said means comprising shoulder forming knives having cutting edges, rectilinear guideways for controlling movement of the knives in paths disposed at right angles to a heightwise median plane of the platen, circular guideways for controlling movement of the knives in curved paths extending transversely of the outsole about axes which lie in the vicinity of said plane and which extend heightwise of the shoe and are arranged substantial distances forward of a heel breast line of the outsole, means for effecting angular bodily setting up adjustments of the knives between positions in which faces of the knives, in which faces cutting edges of the knives lie, are substantially parallel to and are movable along said rectilinear guideways for operation upon Louis work and positions in which said faces are tangent to and the cutting edges lie in and are movable along said curved paths for operation upon Cuban work, means for selectively operating the knives in said rectilinear or curved paths to form upon the outsole heel breast receiving shoulders shaped and arranged for the reception of Louis and Cuban heels respectively, said platen being adjustable lengthwise of the U-shaped opening of the crease plate with relation to said guideways to move forward edges of the side crease plates into different positions adjacent to the rectilinear or curved paths of movement of the shoulder forming knives, and means for moving the circular guideways into different angularly adjusted positions.

10. In a heel seat fitting machine, a platen which comprises spaced side crease plates and has a U-shaped opening the sides of which are formed by edges of said plates, means for moving the side crease plates toward and away from each other to vary the width of said opening, means cooperating with the platen to clamp a heel seat portion of an outsole of a shoe, and mechanism for trimming the heel seat portion of the outsole clamped between the platen and said second-named means to fit the shoe for the reception of a heel, said mechanism comprising shoulder forming knives which are movable in curved paths extending transversely of the outsole and are centered approximately about axes extending generally heightwise of the shoe and positioned substantial distances forward of a heel breast line of the outsole to form heel breast receiving shoulders upon the outsole, said side crease plates being movable lengthwise of said U-shaped opening into different positions adjacent to opposed portions of the paths of movement of the shoulder forming knives in accordance with the widthwise settings of the crease plates.

11. In a heel seat fitting machine, a platen, means for positioning a heel seat portion of an attached outsole of a shoe widthwise and lengthwise upon the platen, means for clamping the positioned heel seat portion of the outsole against said platen, mechanism for trimming the heel seat portion of the outsole to fit the shoe for the reception of a heel, said mechanism comprising shoulder forming knives, mounts for the knives, segment plates having circular guideways in which said mounts are slidable, said guideways being centered substantially about axes which extend generally heightwise of the shoe positioned in the machine and which are arranged substantial distances forward of the heel breast line of the shoe and in the vicinity of the central heightwise plane of the outsole of the shoe, and power operated means for actuating the mounts in timed relation along said guideways to move the shoulder forming knives toward each other about said axes in paths which curve transversely and lengthwise of the outsole to form heel breast receiving shoulders on the outsole, said segment plates in order to vary the paths of movement of the shoulder forming knives being movable into different angularly adjusted positions about axes respectively extending heightwise of the shoe and positioned substantial distances rearward of said shoe and at short distances at opposite sides of said central heightwise plane of the outsole of the shoe.

12. In a heel seat fitting machine, a platen which has a U-shaped opening arranged generally in a plane and which has faces terminating in edges defining sides of said opening, means for positioning a heel seat portion of an attached outsole of a shoe upon the platen, means for forcing the central part of the heel seat portion of the said outsole through the opening and beyond said faces of the platen, a pair of knives having cutting edges a rear portion of each of which is parallel to said faces and a forward portion of each of which is disposed at substantially right angles to said faces, segment plates having guideways which are centered about axes disposed at right angles to the general plane of the U-shaped opening and which lie approximately in a central heightwise plane of the platen and are arranged substantial distances forward of a heel breast line of the outsole, connectors which are secured to the knives respectively and portions of which are movable in said guideways, and power operated means for moving the connectors along said guideways to move the knives inward from opposite sides of the shoe in circular paths with said rear portions of the cutting edges of the knives moving along said faces of the platen and transversely of the heel seat portion of the outsole to form a heel seat tab on the outsole and the front portions of the cutting edges of the knives moving along front edges of the platen and transversely of the outsole to form heel breast receiving shoulders upon the outsole, and means for adjusting the segment plates into different angularly adjusted positions with relation to the heightwise median plane of the platen to vary the paths of movement of the knives transversely of the outsole.

13. In a heel seat fitting machine, a gage for receiving a heel, said gage comprising means for measuring the heel lengthwise and widthwise, a pair of side crease plates having spaced opposing edges, a back crease plate having an edge, said side crease plates being movable toward and away from each other to positions in which their opposing edges form with the edge of the back crease plate a U-shaped opening the width and length of which is determined by the width and the length respectively of the heel, means for forcing the central part of a heel seat portion of an outsole of a shoe through said opening, tab and shoulder forming knives movable widthwise of the deformed outsole, and means for operating the knives to form a heel seat tab and heel breast receiving shoulders upon the outsole.

14. In a heel seat fitting machine, a gage for measuring a heel widthwise and lengthwise, mechanism comprising stops movable into different adjusted positions in accordance with the width and the length respectively of the heel in the gage, a platen comprising a pair of side crease plates which have spaced opposing edges and are movable toward and away from each other, said platen also comprising a back crease plate which has an edge and is mounted for movement with relation to said side crease plates into different adjusted positions, said edges of the side and back crease plates forming in the platen a U-shaped opening, a back gage which is constructed and arranged to be engaged by a shoe and which is secured for movement with the back crease plate and is moved against one of the stops to position the shoe lengthwise, manually actuated hydraulic transmission means for moving said side crease plates toward each other until limited by the other of said stops and for thereafter forcing a heel seat portion of an attached outsole of the shoe to which the heel is to be attached through the U-shaped opening, the power operated means for trimming the heel seat portion of the outsole thus deformed to form on said outsole a heel seat tab and heel breast receiving shoulders.

15. In a heel seat fitting machine, a gage, means for measuring a heel in said gage widthwise, a stop set in accordance with the position of said means, a platen having an opening, said platen comprising side crease plates movable toward and away from each other to vary the width of said opening, presser members for forcing the margin of a heel seat portion of an attached outsole of a shoe against portions of the platen bordering said openings, bulgers for forcing the central part of the heel seat portion of the outsole through said opening and below a face of the platen, fluid pressure transmitting means comprising primary and secondary portions separated by a sequence valve, and a manually operated member, said fluid pressure transmitting means, upon actuation of the manually operated means, being constructed and arranged first to move through fluid pressure in the primary portion of said means the side crease plates toward each other until limited by the stop and for thereafter moving, through fluid pressure in said sequence valve and secondary portions of said fluid pressure transmitting means, the presser members and the bulgers into cooperative positions with the platen to effect the clamping and bulging of the outsole.

16. In a heel seat fitting machine, a platen comprising a plurality of crease plates which are shaped and arranged to form an opening and to support a heel seat portion of an attached outsole of a shoe, a bulger for forcing the central part of the heel seat portion of the outsole through said opening, means for effecting relative adjustment of the crease plates to vary the shape of said opening and for varying the effective shape of the bulger in accordance with the shape of the opening, and knives movable inward from opposite sides of the outsole to form a heel seat tab and heel breast receiving shoulders upon the outsole.

17. In a heel seat fitting machine, a platen comprising a plurality of crease plates which are shaped and arranged to form an opening and to support a heel seat portion of an outsole of a shoe, a bulger comprising a plurality of members for forcing the central part of the heel seat portion of the outsole through said opening and beyond a face of the platen, means for effecting relative adjustment of the crease plates to vary the effective shape of said opening and for effecting relative adjustment between certain of said bulger members to vary the effective shape of the bulger in accordance with the shape of said opening, and knives which are movable inward from opposite sides of the outsole and portions of which are movable along said faces of the platen to form a heel seat tab and other portions of which are movable along front edges of the platen to form heel breast receiving shoulders.

18. In a heel seat fitting machine, a platen comprising a plurality of crease plates constructed and arranged to form an opening, a bulger comprising a plurality of members for forcing the central part of a heel seat portion of an attached outsole of a shoe supported by the crease plates through said opening, means for effecting adjustment of the crease plates lengthwise of the opening to vary the length of said opening, means for effecting the adjustment of the crease plates widthwise of the opening to vary the effective width of said opening, and knives movable inward from opposite sides of the outsole to form a heel seat tab and heel breast receiving shoulders upon the outsole.

19. In a heel seat fitting machine, a platen comprising a back crease plate and side crease plates shaped and arranged to support a heel seat portion of an attached outsole of a shoe and having edges forming a U-shaped opening, a heel gage comprising an abutment for measuring a heel lengthwise, a stop which is operatively connected to and is positioned by said abutment, means for moving the back crease plate with relation to the side crease plates to predetermined positions in accordance with the position of the stop, means comprising bulger members for forcing the central part of the heel seat portion of the outsole through the U-shaped opening and beyond faces of the side crease plates, and knives which are movable inward from opposite sides of the outsole and portions of the cutting edges of which are movable along said faces of the side crease plates and transversely of the outsole to form a heel seat tab and other portions of the cutting edges of which are movable along front edges of the side crease plates and transversely of the outsole to form heel breast receiving shoulders.

20. In a heel seat fitting machine, a platen comprising a pair of side crease plates which have edges forming part of a U-shaped opening and are constructed and arranged to engage in the rand crease of a shoe, a pair of clamping units constructed and arranged to force the margin of a heel seat portion of an outsole of the shoe against portions of the plates bordering said opening, each of said side crease plates and a corresponding clamping unit being mounted for adjustment toward and away from the other side crease plate and clamping unit, a gage having abutments for measuring a heel widthwise, a movable stop, mechanism operatively connecting one of said abutments with the stop to position said stop in accordance with the width of the heel in said gage, means which is constructed and arranged to engage the stop and is operatively connected to the clamping units and to the crease plates to position said units and plates in accordance with the position of said stop, means for forcing the central part of the heel seat portion of the outsole through the U-shaped opening, and knives movable inward from opposite sides of the outsole to form a heel seat tab and heel breast receiving shoulders upon the outsole.

21. In a heel seat fitting machine, relatively adjustable matrix plates which have edges forming an opening and which are constructed and arranged to support a heel seat portion of an outsole of a shoe, a gage comprising relatively movable abutments for measuring a heel widthwise, a movable stop, mechanism operatively connecting one of said abutments with the stop to position said stop in accordance with the width of the heel in said gage, means which is constructed and arranged to engage the stop and is operatively connected to the matrix plates to position said plates in accordance with the position of said stop, means for forcing the central part of the heel seat portion of the outsole through said opening and beyond faces of the positioned matrix plates, and knives which are movable inward from opposite sides of the outsole and portions of cutting edges of which are movable along said faces of the plates and transversely of the outsole to form a heel seat tab and other portions of the cutting edges of which are movable along front edges of the plates and transversely of the outsole to form heel breast receiving shoulders.

22. In a heel seat fitting machine, a platen, means for positioning a heel seat portion of an attached outsole of a shoe upon said platen, means for trimming a horseshoe shaped chip from the heel seat portion of the outsole to fit the shoe for the reception of a heel, and an ejector, said ejector comprising a spring actuated carrier, and a member which is mounted upon said carrier and which is movable to a cocked position against the action of said carrier under pressure of the outsole of the shoe being positioned in the machine, said member after removal of the chip from the outsole being movable under the action of the spring actuated carrier to remove the chip from the machine.

23. In a heel seat fitting machine, a platen, means for positioning a heel seat portion of an attached outsole of a shoe upon said platen, means for trimming a horseshoe shaped chip from the heel seat portion of the outsole to fit the shoe for the reception of a heel, and an ejector, said ejector comprising a spring actuated carrier, and a member which is pivotally mounted upon the carrier, overlies the platen, and has a concave face constructed and arranged to be engaged by the rear end of the outsole of the shoe being positioned in the machine, said member being moved to a cocked position against the action of said spring actuated carrier under pressure of the outsole being positioned in the machine, said member after the horseshoe shaped chip has been trimmed from the outsole being acted upon by the spring actuated carrier to force the chip from the machine.

24. In a heel seat fitting machine, a platen, means for positioning a heel seat portion of an attached outsole of a shoe upon the platen, means for trimming a horseshoe shaped chip from the heel seat portion of the outsole to fit the shoe for the reception of a heel, and an ejector, said ejector comprising a slide movable lengthwise of the platen, means comprising an actuator for operating the slide, a spring for continuously urging the actuator in one direction, a stop for limiting movement of said actuator in said one direction, and a member which overlies the platen, is pivoted to the slide and is yieldingly pivoted upon said slide, said member having a concave forward end constructed and arranged to be engaged by the rear end of the outsole of the shoe being positioned in the machine and to be swung to a slight extent heightwise of the shoe with relation to the slide and lengthwise of the shoe together with the slide as the outsole is forced against said member during the positioning of the shoe in the machine, said member acted upon by the actuator operated slide being constructed and arranged to force over the forward end of said platen the horseshoe shaped chip trimmed from the outsole.

25. In a heel seat fitting machine, a platen, means for positioning a heel seat portion of an attached outsole of a shoe upon said platen, means for trimming a horseshoe shaped chip from the heel seat portion of the outsole to fit the shoe for the reception of a heel, a member which is spring yieldable rearward and heightwise of the shoe under pressure of the outsole of the shoe being positioned in the machine and which after severance of the horseshoe shaped chip from the outsole forces said chip off the forward end of the platen.

26. In a heel seat fitting machine, means for positioning and clamping the heel seat portion of an attached outsole of a shoe, and means for fitting said heel seat portion of the outsole for the reception of a heel, said last-named means comprising a pair of shoulder forming knives, guides for constraining said knives for movement in curved predetermined paths extending transversely and lengthwise of the outsole, means for moving said knives along said paths, and means for angularly varying generally lengthwise of the outsole the positions of said guides and accordingly the paths of movement of said knives.

27. In a heel seat fitting machine, a platen for supporting a heel seat portion of an outsole of a shoe, mechanism for clamping said heel seat portion of the outsole against said platen, means for trimming said heel seat portion of the outsole thus supported and clamped to prepare the shoe for the reception of a heel, said means comprising a pair of shoulder forming knives, a pair of carriers for the knives, a pair of platforms having rectilinear guideways for receiving said carriers, latches for securing said carriers in predetermined positions to the platforms and for releasing the carriers for movement along the rectilinear guideways of the platforms to cause said knives to form heel breast receiving shoulders for the reception of a Louis heel, a pair of segment plates having arcuate guideways, carrier blocks movable along said arcuate guideways, said carrier blocks having arcuate passages, locking means for securing said platforms in two operating positions in said arcuate passages of the carrier blocks, detents for securing the carrier blocks in predetermined positions in said arcuate guideways of the segment plates when the machine is set up for operation upon Louis heels and for releasing said carrier blocks for movement along said guideways to move the shoulder forming knives which are secured through the platforms and the carriers to the carrier blocks, in curved paths extending transversely and lengthwise of the outsole when the machine is set up for Cuban work, and means for operating the knives in said rectilinear and said curved paths.

ELIZABETH A. EICH,
*Administratrix of the estate of Frank A. Eich, deceased.*

LLOYD G. MILLER.

References Cited in the file of this patent
UNITED STATES PATENTS

| Number | Name | Date |
| --- | --- | --- |
| 1,613,407 | Norden | Jan. 4, 1927 |
| 1,742,503 | Gouldbourn et al. | Jan. 7, 1930 |
| 1,743,482 | Ricks et al. | Jan. 14, 1930 |
| 1,773,276 | Perry | Aug. 19, 1930 |
| 2,048,671 | Bessom | July 28, 1936 |